(12) United States Patent
Kuhn et al.

(10) Patent No.: US 12,191,044 B2
(45) Date of Patent: Jan. 7, 2025

(54) USING XENON CONCENTRATION IN CONTROLLING A NUCLEAR POWER PLANT

(71) Applicant: FRAMATOME GmbH, Erlangen (DE)

(72) Inventors: Andreas Kuhn, Geiselbach (DE); Klaus-Peter Hornung, Göllheim (DE); Dreves Heike, Mainaschaff (DE); Andreas Petrasch, Fürth (DE)

(73) Assignee: FRAMATOME GmbH, Erlangen (DE)

( * ) Notice: Subject to any disclaimer, the term of this patent is extended or adjusted under 35 U.S.C. 154(b) by 171 days.

(21) Appl. No.: 17/784,036

(22) PCT Filed: Dec. 12, 2019

(86) PCT No.: PCT/EP2019/084945
§ 371 (c)(1),
(2) Date: Jun. 9, 2022

(87) PCT Pub. No.: WO2021/115605
PCT Pub. Date: Jun. 17, 2021

(65) Prior Publication Data
US 2023/0012716 A1    Jan. 19, 2023

(51) Int. Cl.
*G21C 7/08*     (2006.01)
*G21D 3/00*     (2006.01)
(Continued)

(52) U.S. Cl.
CPC .............. *G21C 7/08* (2013.01); *G21D 3/002* (2019.01); *G21D 3/16* (2013.01); *G21C 3/326* (2013.01); *G21C 17/108* (2013.01)

(58) Field of Classification Search
CPC ........ G21C 7/08; G21C 3/326; G21C 17/108; G21D 3/002; G21D 3/16
(Continued)

(56) References Cited

U.S. PATENT DOCUMENTS

| 4,642,213 A | 2/1987 | Impink, Jr. |
| 4,647,421 A | 3/1987 | Ohashi et al. |

(Continued)

FOREIGN PATENT DOCUMENTS

| DE | 102017205553 A1 | 3/2018 |
| EP | 0540951 A1 | 5/1993 |

(Continued)

OTHER PUBLICATIONS

Corresponding Search Report and Written Opinion for PCT/EP2019/084945.

*Primary Examiner* — Jack W Keith
*Assistant Examiner* — Daniel Wasil
(74) *Attorney, Agent, or Firm* — Davidson Kappel LLC

(57) ABSTRACT

A method is for controlling a nuclear power plant comprising a pressurized water nuclear reactor. The method includes determining that an obtained waiting period and/or a remaining waiting period is greater than a first predetermined time allowing raising of a Xenon concentration to maximal value. The method further includes, responsive to the determination, moving one or more control rods out of the reactor core for compensating the reactivity loss due to an increase of the Xenon concentration, and moving the one or more control rods into the reactor core to a control rod setpoint for the start of power ramp up before the end of the obtained waiting period and/or remaining waiting period.

15 Claims, 10 Drawing Sheets

(51) Int. Cl.
*G21D 3/16* (2006.01)
*G21C 3/326* (2006.01)
*G21C 17/108* (2006.01)

(58) Field of Classification Search
USPC .................. 376/100, 218, 219, 241, 259
See application file for complete search history.

(56) References Cited

U.S. PATENT DOCUMENTS

2010/0142666 A1  6/2010  Shimazu
2013/0177120 A1  7/2013  Cheatham et al.
2016/0329116 A1  11/2016  Grossetete

FOREIGN PATENT DOCUMENTS

| EP | 2157582 A1 | 2/2010 |
| EP | 2686851 B1 | 12/2014 |
| RU | 2553468 C2 | 6/2015 |
| RU | 2555363 C9 | 10/2015 |
| RU | 2605431 C2 | 12/2016 |
| RU | 2675380 C1 | 12/2018 |

USING XENON CONCENTRATION IN CONTROLLING A NUCLEAR POWER PLANT

The present disclosure concerns a method for controlling a nuclear power plant comprising pressurized water reactor.

Further, the present disclosure relates to a controller for a nuclear power plant.

BACKGROUND

The electric grid is feed with electric energy generated of plurality types of energy sources. In particular, the renewable energy sources, for example wind and solar energy are rather volatile. Thus, also nuclear power plants must more and more participate at the regulating of the grid in order to stabilize the grid. The regulating of the electric grid is performed by several grid regulation modes, namely the primary control providing immediate power change within seconds to support the network frequency, a secondary control or load follow operation, in which a request for additional or less energy is remotely commanded, wherein the electric energy change has to be provided latest within 15 minutes. The tertiary control mode provides middle and long-term modification of the power.

Presently, the use of nuclear power plants for the different regulating modes is rather complicated. For example, the nuclear plant operator estimates the Xenon reactivity based on previous experience.

EP 0 540 951 A1 discloses a method and an apparatus for controlling a nuclear reactor to minimize boron concentration during load follow operation. Regarding this the main focus is put to the control of the axial power distribution and the corresponding axial Xenon oscillation during load follow operation in combination with the objective to minimize boric acid and deionized water injections.

DE 10 2017 205 553 A1 discloses a method for predicting the Xenon concentration during the ramp up period of a nuclear power plant in a load follow operation.

EP 2 686 851 B1 discloses a method for operating a Pressurized Water Reactor during Load following operation.

EP 2 157 582 A1 discloses a method for predicting the Xenon vibration. For that purpose, the axial distribution of the power of the reactor is determined in order to quickly suppress the Xenon oscillation.

SUMMARY

In view of the above, an object of the present disclosure is to provide an improved method for controlling a nuclear reactor, which can be operated in many different network control modes with a high reliability.

According to one aspect, a method is provided for controlling a nuclear power plant comprising pressurized water nuclear reactor having a reactor core producing power, a primary circuit connecting the reactor core to a steam generator, one or more of control rods, which can be moved into the reactor core for controlling the power of the reactor core, an injecting device for injecting boric acid and/or deionized water into the primary circuit for controlling the reactivity of the reactor core, the method comprising:
  determining an actual power of the nuclear reactor,
  determining automatically an actual Xenon concentration, an actual Iodine concentration and/or an actual Xenon reactivity,
  obtaining a target power and a power gradient for a power ramp up period until a target power, characterized in that the method further comprises:
  obtaining a waiting period and/or a remaining waiting period in which the nuclear reactor works at a partial power until it ramps up to a target power being higher than the partial power,
  calculating for the end of the waiting period and/or remaining waiting period the Xenon reactivity and/or Xenon concentration based on the actual Xenon concentration, the actual Iodine concentration and the obtained waiting period,
  calculating, for the end of the power ramp up period, the Xenon reactivity and/or the Xenon concentration,
  calculating a control rod setpoint for the start of power ramp up for the one or more control rods based on the calculated Xenon reactivity and/or Xenon concentration at the end of the waiting period and the end of the ramp up period, such that the power ramp up can be performed using the control rods,
  positioning, during the waiting period, the one or more control rods based on the waiting period and the control rod setpoint for the start of the power ramp up, such that the one or more control rods reach the control rod setpoint for the start of power ramp up at the end of the waiting period.

Further embodiments may relate to one or more of the following features, which may be combined in any technical feasible combination:
  the calculation of the control rod setpoint for the start of power ramp up is further based on one or more reactivity values and/or reactivity coefficients of the nuclear reactor, in particular one or more reactivity coefficients of the one or more control rods, a reactivity coefficient of one or more L-rods, a reactivity change due to the difference of the Average Coolant Temperature (ACT) between the actual power and the target power, a reactivity change due to the difference between the actual power and the target power, and/or reactivity contribution of a follow up flow of injected boric acid or deionized water in combination with the coefficient of the boric acid in the primary cooling fluid;
  the calculation of the control rod setpoint for the start of power ramp up is further based on the full power setpoint of the control rods and/or the full power setpoint of the L-rods;
  when the waiting period is greater than a first predetermined time, allowing raising of the Xenon concentration to maximal value, the method further includes: moving the one or more control rods out of the reactor core for compensating the reactivity loss due to the increase of the Xenon concentration, and moving the one or more control rods into the reactor core to the control rod setpoint for the start of power ramp up before the end of the waiting period;
  in case the control rods reach at an upper control limit or a full load position when moving out of the reactor core, adding some deionized water to maintain the reactor at partial power to compensating the reactivity loss due to the increase of the Xenon concentration in particular to ensure the controllability of the reactor power;
  the method further comprises determining a time limit for one or more control rods to move to the control rod setpoint for the start of power ramp up based on the actual control rod position, the control rod setpoint for the start of the power ramp up and actual boric acid concentration in the primary cooling fluid, in order to move the one or more control rods into the reactor core to the control rod setpoint for the start of power ramp up before the determined time limit by injection of deionized water into the primary circuit, and adding deionized water to the primary circuit;

the time limit is further determined based on the minimum feed in rate of the deionized water;

when the waiting period is shorter than a second predetermined time, the second predetermined time being longer than the first predetermined time, wherein the one or more control rods (16) are moved, after the Xenon concentration has reached its maximum during the waiting period, into the reactor core for compensating the reactivity increase due to the decrease of the Xenon concentration.

when the waiting period is shorter than a second predetermined time, the second predetermined time being longer than the first predetermined time, the method further comprises, when during the movement into the reactor core, the control rods reach the control rod setpoint for the start of power ramp up, adding boric acid to the primary circuit and maintaining the control rods at the control rod setpoint for the start of power ramp up, in particular to ensure the shutdown reactivity;

when the waiting period is longer than a second predetermined time, the second predetermined time being longer than the first predetermined time, the method further comprises after the Xenon concentration has reached its maximum during the waiting period, adding boric acid into the primary circuit for compensating the reactivity increase due to the decrease of the Xenon concentration, wherein, in particular, the control rods remain at the upper control limit or full power position until the movement of the one or more control rods (16) into the reactor core to the control rod setpoint for the start of power ramp up before the end of the waiting period;

the first predetermined time corresponds to a time 2 h after the Xenon maximum or 30% of the waiting time until the Xenon maximum after the Xenon maximum;

the first predetermined time is between 6 h and 10 h and/or the second predetermined time is between 20 h and 60 h; and/or a total reactivity is calculated including the Xenon reactivity for the end of the waiting period and the end of the ramp up period for ramping up the power to the target power for calculating the control rod setpoint for the start of power ramp up.

According to another aspect, a controller is provided for a nuclear power plant comprising pressurized water reactor having a reactor core producing power, a primary circuit connecting the reactor core to an steam generator, one or more of control rods, which can be moved into the reactor core for controlling the power of the reactor core, an injecting device for injecting boric acid and/or deionized water into the primary circuit for controlling the reactivity of the reactor core, the controller is adapted to determine an actual power of the nuclear reactor,
determine automatically an actual Xenon concentration, an actual Iodine concentration and/or an actual Xenon reactivity,
obtain a target power and a power gradient for a power ramp up period until a target power,
characterized in that the controller is further adapted to:
obtain a waiting period and/or a remaining waiting period in which the nuclear reactor works at a partial power until it ramps up to a target power being higher than the partial power,
calculate for the end of the waiting period and/or remaining waiting period the Xenon reactivity and/or Xenon concentration based on the actual Xenon concentration, the actual Iodine concentration and the obtained waiting period,
calculating, for the end of the power ramp up period, the Xenon reactivity and/or the Xenon concentration,
calculate a control rod setpoint for the start of power ramp up for the one or more control rods based on the calculated Xenon reactivity and/or Xenon concentration at the end of the waiting period and the end of the ramp up period, such that the power ramp up can be performed using the control rods,
positioning, during the waiting period, the one or more control rods based on the waiting period and the control rod setpoint for the start of power ramp up, such that the one or more control rods reach the control rod setpoint for the start of power ramp up at the end of the waiting period.

According to embodiments, the controller is adapted to perform a method disclosed herein.

Further advantages, features, aspects and details are evident from the description and the drawings.

So that the manner in which the above recited features of the present disclosure can be understood in detail, a more particular description of the present disclosure, briefly summarized above, may be read by reference to embodiments. It is to be noted, however, that the appended drawings illustrate only typical embodiments of this present disclosure and are therefore not to be considered limiting of its scope, for the present disclosure may admit to other equally effective embodiments.

BRIEF SUMMARY OF THE DRAWINGS

The accompanying drawings relate to embodiments of the present disclosure and are described in the following.

DETAILED DESCRIPTION

Figure 1:
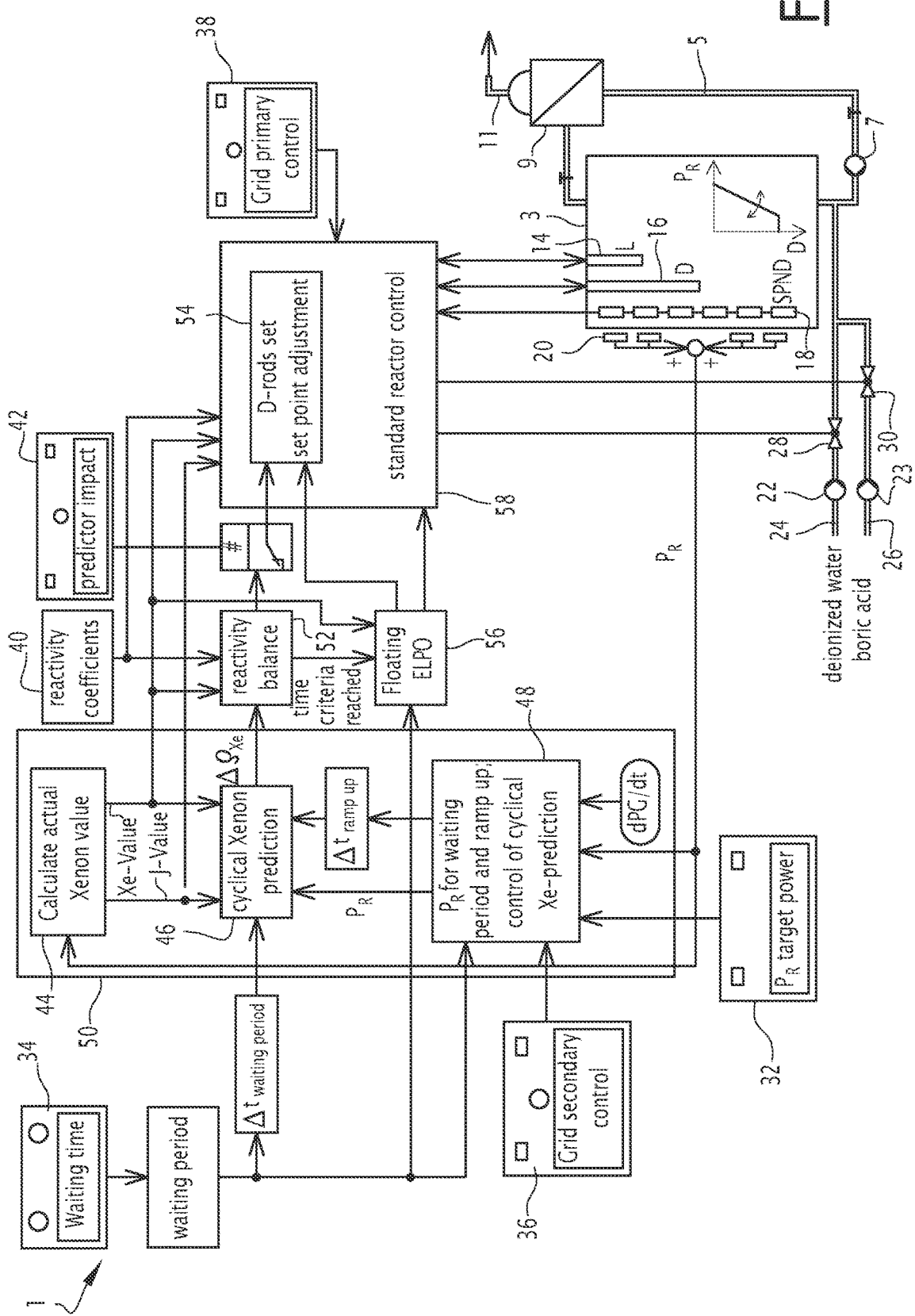
FIG. 1 shows schematically a flow chart of a method according to an embodiment.

FIG. 1 shows schematically a flow chart of a method according to an embodiment for a pressurized water nuclear reactor. The nuclear reactor 3 includes a reactor pressure vessel which includes fuel rods in a reactor core. The nuclear reactor 3, in particular the reactor pressure vessel, is connected to one or more primary cooling fluid circuit(s) 5 or primary circuit(s) 5, in which the cooling fluid is driven by a main coolant pump 7. The one or more primary circuit(s) 5 transports with the cooling fluid the heat generated by the nuclear fission of the nuclear fuel in the fuel rods to one or more heat exchanger(s) 9. The pressure in the one or more primary circuit 5 is so high that an evaporation of the water or cooling fluid circulating in the primary circuit is avoided.

The one or more heat exchanger(s) or steam generator(s) 9 generate(s) steam, for example from water or a secondary cooling fluid circulating in one or more secondary circuit(s). The steam is then transported via the one or more secondary circuit(s) 11 to one or more steam turbine(s), where the steam generated from the secondary cooling fluid expands and generates a rotation which is used by one or more electric machine for generating electrical energy. The secondary cooling fluid is condensed and provided back to the heat exchanger 9.

The nuclear reactor 3 includes a plurality of rods that are adapted to be driven between the fuel rods for controlling the power generated by the nuclear reactor 3. For example, the nuclear reactor includes so called L-rods 14 and D-rods 16. The L-rods 14 are provided mainly to control the local power density within the reactor core or the axial power distribution. The D-rods or control rods 16 are provided to control the absolute power of the reactor core. The control rods 16 absorb neutrons and depending on the insertion depth, the power production of the nuclear reactor can be controlled, for example because the influence the neutron flux within the reactor. Therefore, by using the control rods 16, the power of the nuclear reactor 3 can be quickly adapted. The control rods 16 are organized in sets (or banks) of control rods 16. For example, a nuclear reactor 3 may include a plurality of sets of control rods 16, each including between 3 and 8 control rods 16.

A movement of the control rods 16 or set of D-rods is possible between the position of the L-rods, in particular the free end of the L-rods 14, for example where the free end of the control rods 16 corresponds to the free end of the L-rods 14, and the fully inserted end position or lower end position for the control rods 16. The free end of the L-rods 14 and the control rods 16 corresponds to the lower end, if the rods are inserted from the top of the nuclear reactor 3. In an embodiment, the fully inserted end position of the control rods 16 ends is nearly the bottom of the reactor core of the nuclear reactor 3. For example, lower end position is about at 300 cm insertion of the control rods 16. The insertion depth of the control rods 16 and the L-rods 14 is determined based on the free end extending into the reactor core. In the present example, it is considered that the control rods 16 and L-rods 14 are inserted from the top into the nuclear reactor 3. Other types of nuclear reactors may have control rods 16 and L-rods 14 which are inserted from the bottom. Then, the fully inserted end position is an upper end position for the control rods 16.

For example, a typical PWR (pressurized water reactor) with German design with about 1500 MW electrical power has 4 moving sets (or banks) of control rods 16 with 4 control rods each to control the reactor power. Such a reactor may have a set of L-rods with about 45 L-rods.

For monitoring and controlling of the nuclear reactor 3 there are provided a plurality detectors for continuous detecting the neutron flux density, where according to an embodiment eight times six detectors are provided in a so called SPND (self powered neutron detector) lance 18.

How to control the axial power distribution and the corresponding axial Xenon oscillation with the L-rods, is, according to embodiments, part of a standard reactor control 58 as it is used with the "adaptive Power Distribution control" in PWR with German design. This "adaptive Power Distribution control" is triggered by an "axial 2-point-Xenon-calculation" module (one point for the upper and the other point for the lower core half; input is given by the SPND lances 18). The dynamic of the "adaptive Power Distribution control" is adapted in that way that the needed L-rod position change is made in parallel to the load change. Therefore, this adaptive Power Distribution control substantially needs no injections of boric acid and deionized water to compensate the change of the position of the L-rod which is used to control the axial Power Distribution PD at part load. In other words the position changes of the L-rods to control the axial power distribution is, regarding the reactivity, compensated by the reactivity effect due to the change of the reactor power.

According to embodiments, the sets of control rods 16 can be inserted one after the other. The sets of control rods or the control rods 16 have only a slight influence to the axial power distribution. The power of the nuclear reactor is controlled and thus the movement of the control rods 16 depending on the measuring of the average coolant temperature—ACT.

The minimization of BODE-injections (boric acid and/or deionized water injections) is made according to the present disclosure and is given by the means of an entire reactivity control, which is adapted to the several grid related control modes.

Further, the nuclear reactor includes sensors 20 for detecting the power of the nuclear reactor 3, for example via the neutron flux.

According to embodiments, the power of the nuclear reactor 3 is controlled via the power regulated at a generator level. The control rods 16 and L-rods 14 are then moved in order to adapt the power of the nuclear reactor 3 to the power required by the generator. When the power of the nuclear reactor 3 is adapted, also the temperature of the primary cooling fluid is changed. A higher power results in a higher temperature of the primary cooling fluid. The temperature of the cooling fluid has also an effect on the reactivity of the nuclear reactor 3.

Long term modification of the reactivity, in particular due to Xenon and fuel consumption is controlled by amending the concentration of boric acid and/or deionized water. These addition of one of these two fluids could be also called BODE addition or injection in the present disclosure. The boric acid within the primary circuit 5 acts as a neutron absorber. Thus with a higher concentration of boric acid the power or the reactivity is reduced. To increase the reactivity deionized water is added to the primary circuit 5 in order to reduce the concentration of boric acid and thus to increase the reactivity. There are separate pumps 22, 23 to inject deionized water 24 and/or boric acid 26 into the primary circuit 5. The pump 22 is provided to inject deionized water 24 and the pump 23 is provided to inject boric acid 26 into the primary circuit 5. The amount of deionized water 24 and/or boric acid 26 can be controlled using valves 28, 30 and/or the pumps 22, 23. The pumps 22, 23 are operated, only in the case of a required BODE-injection.

The control of a nuclear reactor is rendered complicated due to the complex time dependent function of the Xenon-135 (called Xenon or Xe herebelow) concentration in the reactor core. Xenon acts as neutron poison or neutron absorber. The Xenon values change within hours. The Xenon is created due to the fission chain of the nuclear fuel and disappears when absorbing neutrons and by Xenon decay. However, the creation and the neutron absorption appears with a time delay, so that for the actual and future power of the nuclear reactor, the actual, past and future values of the Xenon must be taken into account, in particular for optimal controlling of the position of the control rods 16 via the concentration of the boric acid (by BODE-injection). When a nuclear power plant operates a long time at a constant power, the Xenon concentration reaches an equilibrium or steady state. The Xenon reactivity is a linear function of the Xenon concentration.

Figure 2:
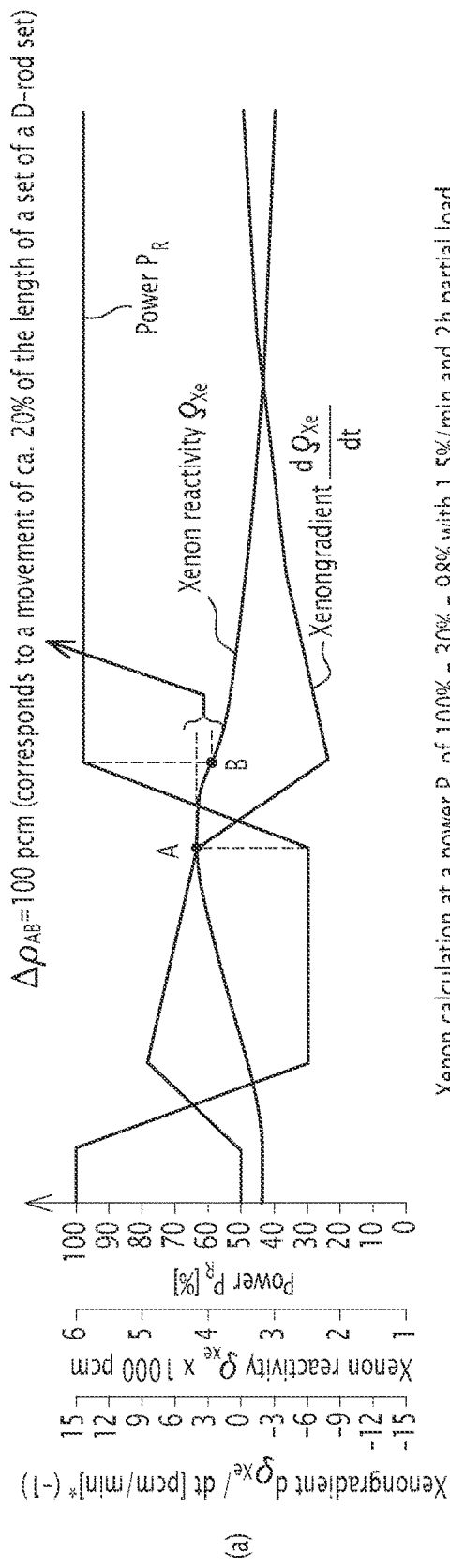
FIG. 2 shows graphically the Xenon reactivity in dependence of power ramps of the reactor.
Figure 2:
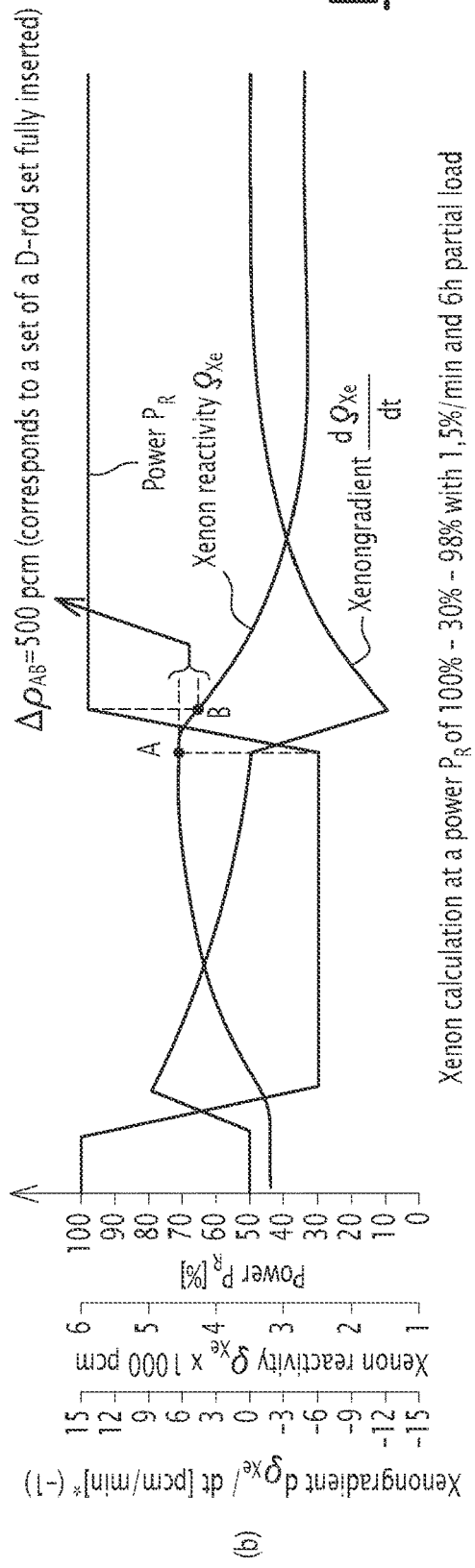

FIG. 2 shows two examples of a nuclear reactor operating for a specific time at a partial power.

In FIG. 2(*a*) the power $P_R$ is first at 100% (i.e. the full power of the nuclear reactor) and then reduced to 30% of the full power. The partial power of 30% of the full power is then maintained for about 2 h before the power is ramped up, at point A, to 98% of the full power. During partial power, the Xenon concentration increases and therefore also the Xenon reactivity. At point B, the nuclear reactor reaches the target power of 98% of the full power. As it can be seen, the Xenon reactivity, on ramp up, i.e. between points A and B, is reduced as the reactor burns off the Xenon-135, which begins to absorb more neutrons and reduces the reactivity shortly after the point A. As it can be seen from FIG. 2(*a*), the reduction of the xenon reactivity between point A and point B due to the burn off of Xenon is about 100 pcm, which corresponds to the movement of about 20% of a length a set of D-rods or control rods.

In FIG. 2(*b*) the power $P_R$ is first at 100% (i.e. the full power of the nuclear reactor) and then reduced to 30% of the full power. The partial power of 30% of the full power is then maintained for about 6 h before the power is ramped up, at point A, to 98% of the full power. At point B, the nuclear reactor reaches the target power of 98% of the full power. As it can be seen, the Xenon reactivity, on ramp up, i.e. between points A and B, is reduced as the reactor burns off the Xenon-135, which begins to absorb more neutrons and reduces the reactivity shortly after the point A. As it can be seen from FIG. 2(*b*), the reduction of the xenon reactivity between point A and point B due to the burn off of Xenon is about 500 pcm, which corresponds to the movement of about 100% of a set of D-rods or control rods.

Thus, it can be seen that the Xenon concentration, and therefore the reactivity based on the Xenon depends largely on the waiting period and the previous operation of the nuclear reactor 3.

A nuclear power plant can be operated in several operating modes related to the needs of the electrical grid.

In a primary control mode providing immediate power within seconds to support the network frequency, wherein the additional power is provided between 0 and 15 minutes (normally within seconds) for stabilizing the grid frequency. The primary control is deducted from the grid frequency deviation to the standard frequency.

In a secondary control mode providing the required power from the power plant latest after 15 minutes. This is also named load follow operation. In the secondary control mode for which a request for additional energy is remotely commanded via the generator target power, which can be changed stepwise. The additional electric energy has to be provided latest within 15 minutes. Only the maximal power gradient dPG/dt and the power range are known in advance. The partial power operating time may be several hours. The power changes are requested in a stochastic manner. In the secondary control, the $P_R$ target power must be achieved at any moment, so that the control rods 16 must have a specific predefined or predetermined position.

The tertiary control mode provides middle and long-term modification of the power. In the tertiary control, the duration and the required power is determined between the grid operator and the reactor operator.

The primary control can be applied in parallel to the secondary and the tertiary control.

In the tertiary control, a power ramp up will be carried out after a waiting time according to the agreement between the reactor operator and the operator of the power grid. The power ramp up depends on the actual reactor power $P_R$, the $P_R$ target power and the power ramp up, called also power gradient dPG/dt. As stated above, the power request is provided by the generator control to the nuclear reactor. Thus, also the power gradient dPG/dt, which has to be provided to the power grid is provided by the generator control. In the tertiary control mode this corresponds to the value which is used and in the secondary control mode this corresponds to the maximal power gradient.

In FIG. 1, the flow chart includes several input values, in particular the actual reactor power $P_R$, which is measured using the sensors 20, the $P_R$ target power 32, which is for example provided by the reactor operator, the waiting period 34, for example provided by the reactor operator, until the ramp up of the power to the $P_R$ target power 32, the grid secondary control 36, which can be for example activated or deactivated by a button 36, the grid primary control 38, which can be for example activated or deactivated by a button 38, the reactivity coefficients 40, which are automatically determined, and a control set value predictor impact 42 to activate or deactivate the control rod sets setpoint adjustment based on a total reactivity balance.

The actual reactor power $P_R$ can be also determined using other means, for example by determining the power of the electric generator.

The reactivity coefficients 40 are provided by core design calculation, which is done for each fuel element cycle. These coefficients are variables in the software of the reactor control and they are dependent of the equilibrium boron concentration of the reactor core, which decreases during the entire fuel element cycle to compensate the fuel burn up. In other words, the reactivity coefficients are calculated based on the equilibrium boron concentration of the reactor core.

These variables are set via a service unit during fuel element change respectively outage. In other words, a characteristic curve is used to determine each reactivity coefficient based on the equilibrium boron concentration of the nuclear reactor 3. The reactivity coefficients 40 slowly change during the fuel element cycle. The equilibrium boron concentration of the reactor core is the concentration of boric acid which is used during an operation of the nuclear reactor 3 at a steady or constant power over a long period of time, in particular when the Xenon concentration reaches a steady value at full power. A plurality of reactivity coefficients, which are used, will be explained with FIG. 10 here-below. As the reactivity coefficients 40 change very slowly they can be considered constant for the calculation of the reactivity balance. In other words, the reactivity coefficients are variables, which are dependent of the "full load days" in the actual fuel element cycle (for example 1 year) or a related parameter (as a reference boron concentration in full load equilibrium conditions) and can be set as a characteristic via an interface or service unit of the reactor control during fuel element change according to the core design of the next core.

The flow chart in FIG. 1 includes an actual value calculation module 44 in which the actual concentration values of Xenon and Iodine in the nuclear reactor 3, in particular in the reactor core of the nuclear reactor 3, are calculated based on the actual and past power $P_R$ of the nuclear reactor 3. The actual Xenon value is also designated Xe-value in FIG. 1 and the actual Iodine value is designated J-value. In other embodiments, as shown in FIG. 4, the Xenon reactivity $\rho_{Xe}$ is provided instead of the Xenon concentration.

Figure 4:
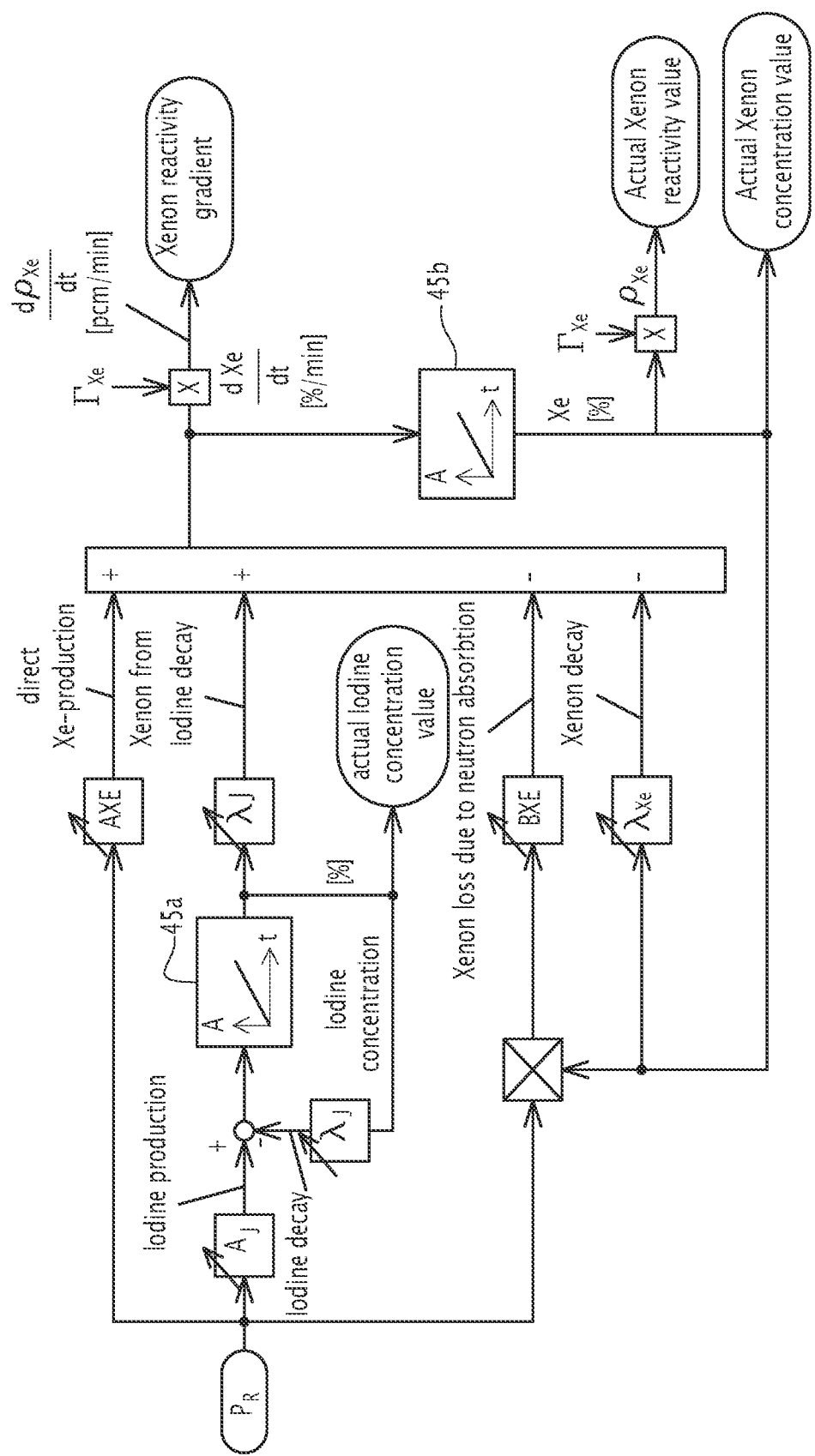
FIG. 4 shows schematically the model for determining the actual Iodine and Xenon values.

FIG. 4 shows the calculation of the actual concentration values of Xenon and Iodine based on the actual and past power $P_R$ of the nuclear reactor. The calculation is adapted to the type of the nuclear reactor 3 and the charging with nuclear fuel. The input value is the actual power $P_R$ of the nuclear reactor. The boxes marked with $\Gamma_{Xe}$, $\lambda_J$, $\lambda_{Xe}$, BXE, $A_J$, AXE are linear functions using known parameters. The boxes with a cross are multipliers. The past values of the power $P_R$ of the nuclear reactor 3 is taken into account by the integrator 45a with regard to the iodine concentration. In other words, the integrator obtains via the integration of the difference between the Iodine production and the Iodine decay the actual Iodine concentration value. The Xenon decay and the Xenon loss due to neutron absorption is subtracted from the sum of the direct Xenon production and the Xenon from Iodine decay. The integrator 45b calculates from the Xenon concentration gradient the Xenon concentration actual value. In the embodiment shown in FIG. 4, using $\Gamma_{Xe}$ the calculation gets the actual Xenon reactivity value $\rho_{Xe}$. For example, the reactivity value of the Xenon is provided in the unit pcm—percent mille.

The flow chart in FIG. 1 further includes a predictor module 46. The predictor module performs a cyclical prediction of the concentration of Xenon, and in particular Iodine, in the nuclear reactor 3, in particular the nuclear core of the nuclear reactor 3.

The predictor module 46 predicts the concentration of Xenon for the waiting period, in particular for the end of the remaining waiting period and the end of the ramp up period. For that purpose, the predictor module obtains the actual Xenon and Iodine concentration values from the actual value calculation module 44, the time needed for ramp up $\Delta t_{ramp\ up}$ and the set values for the reactor power $P_R$ for the waiting period and the ramp up period from a control module 48.

The control module 48 provides all needed values for the Xenon prediction based on the input value of the $P_R$ target power, whether the nuclear reactor 3 should work in a secondary control mode (obtained from block 36), the remaining waiting period and the actual power $P_R$ of the nuclear reactor 3.

Figure 3:
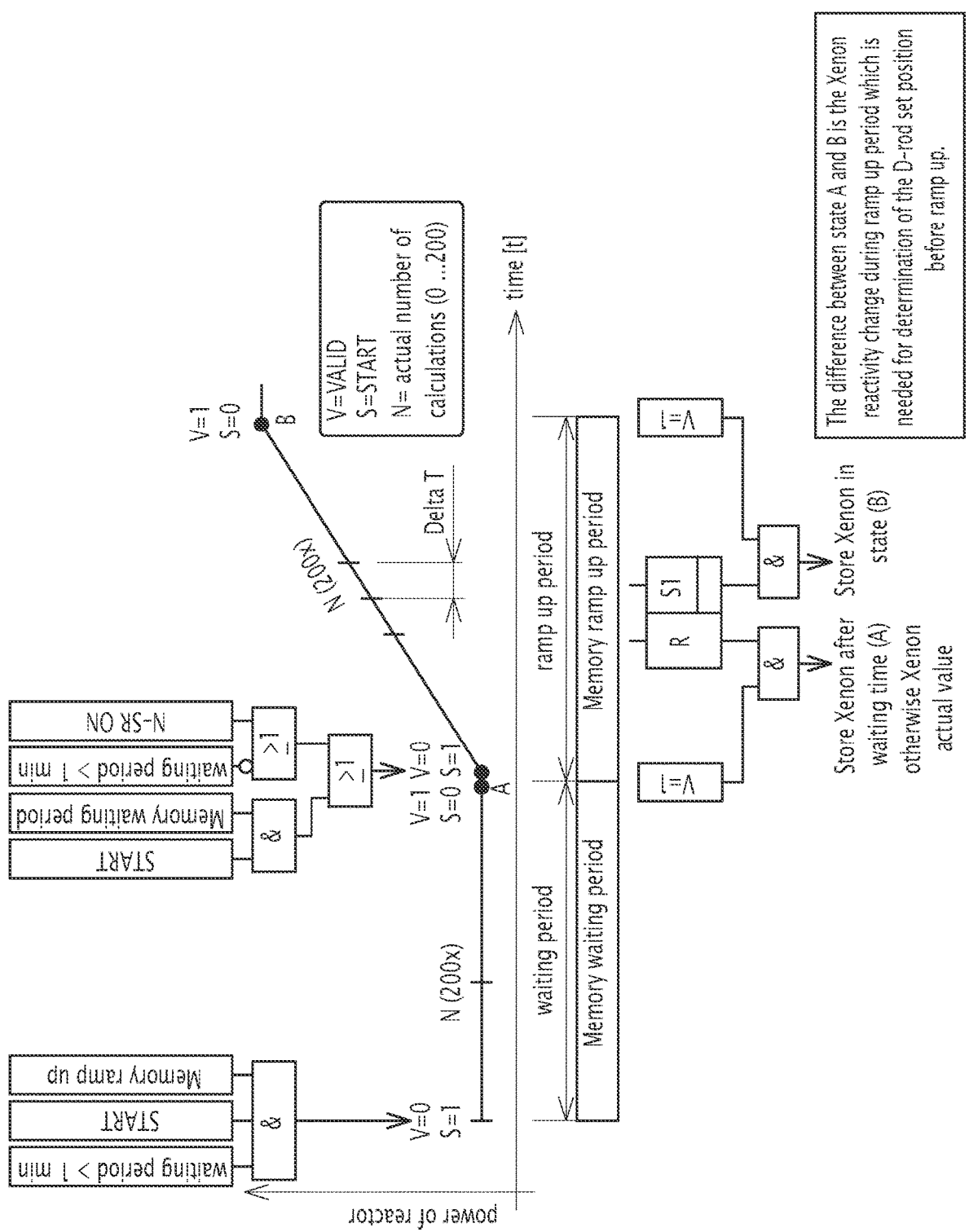
FIG. 3 shows schematically the control of the calculation of the Xenon reactivity during the waiting period and the ramp up period.
Figure 5:
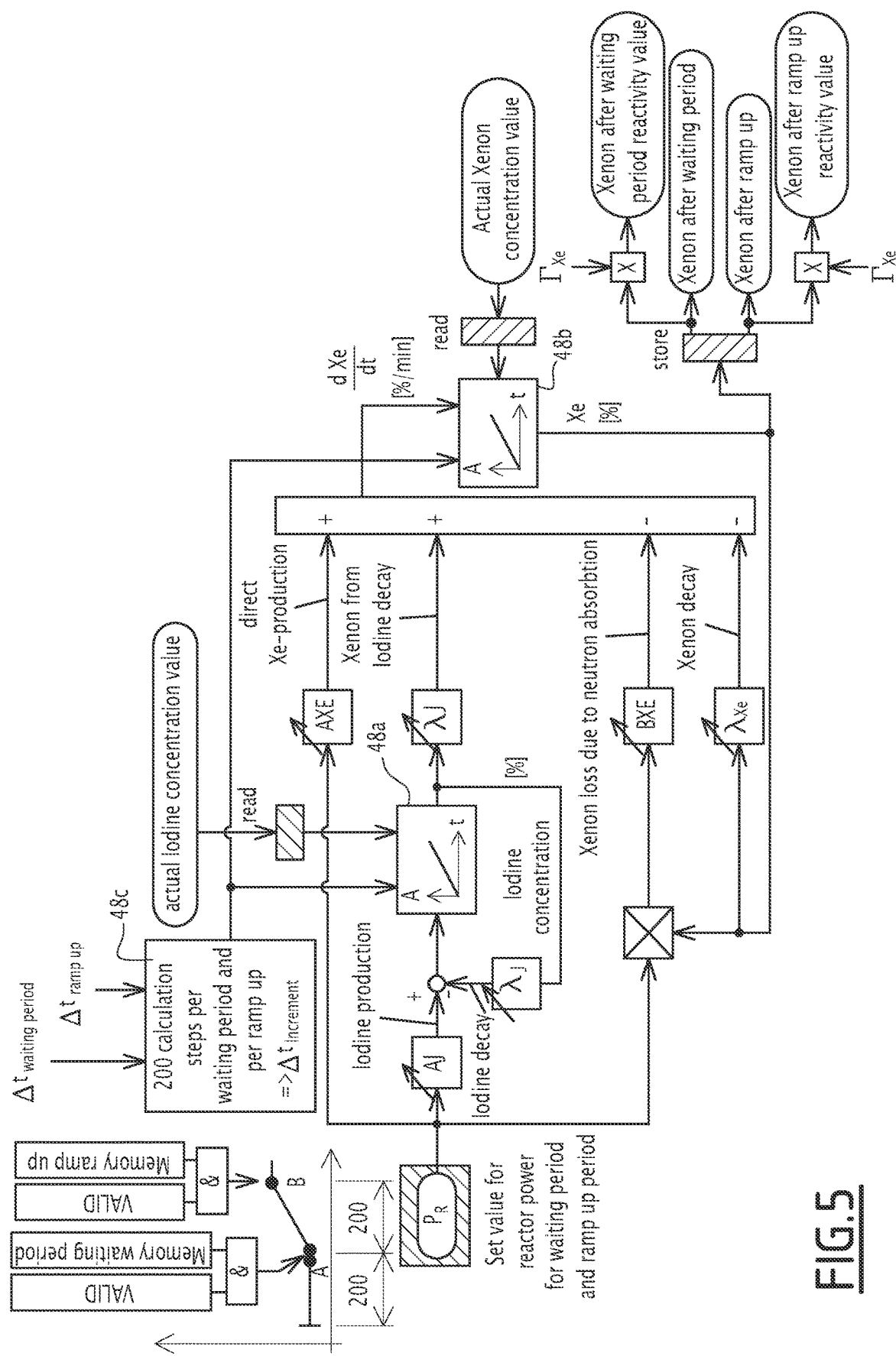
FIG. 5 shows schematically the model for predicting the Xenon concentration.

The functioning of the predictor module 46 is explained with respect to FIGS. 3 and 5. The predictor module 46 calculates in an iteractive manner the Xenon concentration and thus the Xenon reactivity. In an embodiment, in addition the Iodine concentration values are also calculated. The boxes marked with $\Gamma_{Xe}$, $\lambda_J$, $\lambda_{Xe}$, BXE, AJ, AXE are linear functions using known parameters. The boxes with a cross are multipliers. To take into account the time dependency of the Iodine concentration the integrator 48a is used. In other words, the integrator obtains via the integration of the difference between the Iodine production and the Iodine decay the Iodine concentration value. The Xenon decay and the Xenon loss due to neutron absorption is subtracted from the sum of the direct Xenon production and the Xenon from Iodine decay. The integrator 48b calculates from the Xenon concentration gradient dXe/dt the Xenon reactivity actual concentration value $\rho_{Xe}$. For starting the prediction, the actual Xenon concentration value and the actual Iodine concentration values are read once at the beginning of the predictor operation. The box 48c triggers each calculation steps with specific time increments, as it will be explained below. Using $\Gamma_{Xe}$ the calculation gets the predicted Xenon reactivity values $\rho_{Xe}$ for the end of the waiting period or the end of the ramp up, as it also will be explained below. According to embodiments, the end of the waiting period corresponds to the start of the power ramp up.

The (remaining) waiting period and ramp up period is divided for the purpose of calculation into a predefined number of steps. According to an example, between 50 and 500 steps are used, in particular between 100 and 300. In the embodiment shown 200 steps are respectively calculated for the waiting period and the ramp up. This means that for the waiting period and the ramp up period, the time distance Delta T or $\Delta t_{increment}$ between two subsequent calculation steps may be different, as for example the ramp up period may be substantial shorter than the waiting period. For example, as the Xenon concentration and/or Xenon reactivity during the waiting period, after reaching its maximum, always tend to reach an equilibrium state, a fixed number of calculation steps can be used despite the lengths of the waiting period of for example 40 hours or 100 hours or more.

If the waiting period is zero, for example when the nuclear reactor 3 is operated in the secondary mode, see below, only the prediction for the ramp up period is calculated. For the purpose of calculation, the predictor module 46 stores the calculated predicted Xenon concentration, Xenon reactivity values and/or Iodine concentration values in a respective memory. In an example, the Xenon concentration value and/or the Xenon reactivity $\rho_{Xe}$ is stored for the end of the waiting period (see point A in FIG. 3) and after the ramp up period (see point B) in FIG. 3. $\Delta t_{increment}$ in FIG. 5 correspond to $\Delta t_{ramp\ up}$ and $\Delta t_{waiting\ period}$ in FIG. 1.

It should be noted that the prediction for the waiting period is only performed, in case the nuclear reactor should work in the tertiary control mode and not the secondary control mode (or load follow operation marked with N-SR in the drawings).

The actual Iodine concentration and the actual Xenon concentration or reactivity values are read respectively for the beginning of the waiting period for the calculation, if a waiting period exists, or for the beginning of the ramp up (in case of no waiting period or when the waiting period has lapsed).

It should be noted that the waiting period decreases with the time progress, i.e. the beginning for the purpose of the calculation progresses for each time the prediction module 46 starts again with the complete calculation of the Xenon concentration, the Xenon reactivity and/or the Iodine concentration values.

Based on the set value of the reactor power $P_R$ for the waiting period and the ramp up period, the Xenon reactivity $\rho_{Xe}$ or the Xenon concentration in particular after the waiting period (point A in FIGS. 3 and 5) and after the ramp up period (point B in FIGS. 3 and 5) is stored.

The Xenon concentration or the Xenon reactivity $\rho_{Xe}$ after the ramp up period (Point B) and the Xenon concentration or the Xenon reactivity before the ramp up period or start of the power ramp up (Point A; either at the end of the waiting period for the tertiary control mode or the actual Xenon concentration for the secondary control mode) are used to determine, by the predictor 46, the Xenon concentration change and/or the Xenon reactivity change $\Delta\rho_{Xe}$ during the ramp up period.

According to embodiments, the predictor module 46 calculates also the Iodine concentration for the waiting period and/or the ramp up period, in particular at the end of the waiting period.

The actual value calculation module 44 and the predictor module 46 and the control module 48 are forming together a tandem module 50 which is running automatically and in real time in a digital reactor control system. For example, each actual value calculation module 44 and the predictor module 46 respectively calculate the predicted Xenon reactivity and/or concentration values every 50 milliseconds. The new prediction of the predictor module 46 is based on respectively updated actual Xenon and Iodine concentration values. The time for calculation of the Xenon reactivity for each which means for the waiting period and for the ramp up period requires respectively about 10 seconds based on 200 calculation steps. That means 20 seconds totally related to tertiary control and only 10 seconds related to the stochastic secondary control, where quicker calculation results are desired. The accuracy of this method is discussed later on.

The prediction values enable to calculate the support of the Xenon reactivity $\rho_{Xe}$ during the ramp up phase. It should be noted that the Xenon reactivity and/or Xenon concentration only depends on the power and its time dependent change of the nuclear reactor. This Xenon reactivity or concentration prediction is only a part of an entire reactivity balance which is needed to determine the optimal control rod 16 position before the next ramp up.

The predicted Xenon reactivity change $\Delta\rho_{Xe}$ during ramp up from the prediction module 46 is provided to a reactivity balance module 52, which additionally considers that part of the total reactivity balance which is based on reactivity coefficients provided by the reactivity coefficient module 40. In detail one or more of the following reactivity effects—besides Xenon—are also considered for calculating a predetermined control rod setpoint for the start of power ramp up or at the beginning of the ramp up and/or the total reactivity balance. In particular according FIG. 10 the reactivity balance is visualized for a reactor operator.

The (total) reactivity balance is adapted to determine, based on the reactivity values, the optimal control rod 16 position, such that the nuclear reactor can reach the $P_R$ target power at any moment or after the waiting period using the control rods 16. This optimal control rod position may be also called predetermined control rod setpoint for the start of power ramp up in the present application.

The control rod position may be then provided to the control rods set setpoint adjustment 54. In the FIG. 10, the $P_R$ target power is set to 100% of full load, which is the maximal allowed power of the nuclear reactor 3. For that purpose, the total reactivity ($\rho\rho$ in FIG. 10) taking into account also the predicted Xenon reactivity change $\Delta\rho_{Xe}$ during ramp up should be in the optimal case zero.

The potential reactivity $\rho_D$ (possible reactivity increase due to the raising of the D-rods or control rods 16 ($\Delta D$). The reactivity potential can be calculated based on the effectivity $\Gamma_{DM}$, of the control rods, which is a reactivity coefficient provided by the reactivity coefficient module 40, and their actual insertion depth ($\Delta D$) below the lower end of the L-rods; the effectivity $\Gamma_{DM}$ is averaged with the respect to varying efficiency depending on the insertion depth. The reactivity potential $\rho_D$ is calculated by multiplying the effectivity $\Gamma_{DM}$ with the actual insertion depth ($\Delta D$) and corresponds to the reactivity potential by raising the control rods or D-rods until the lower end of the L-rods.

Figure 10:
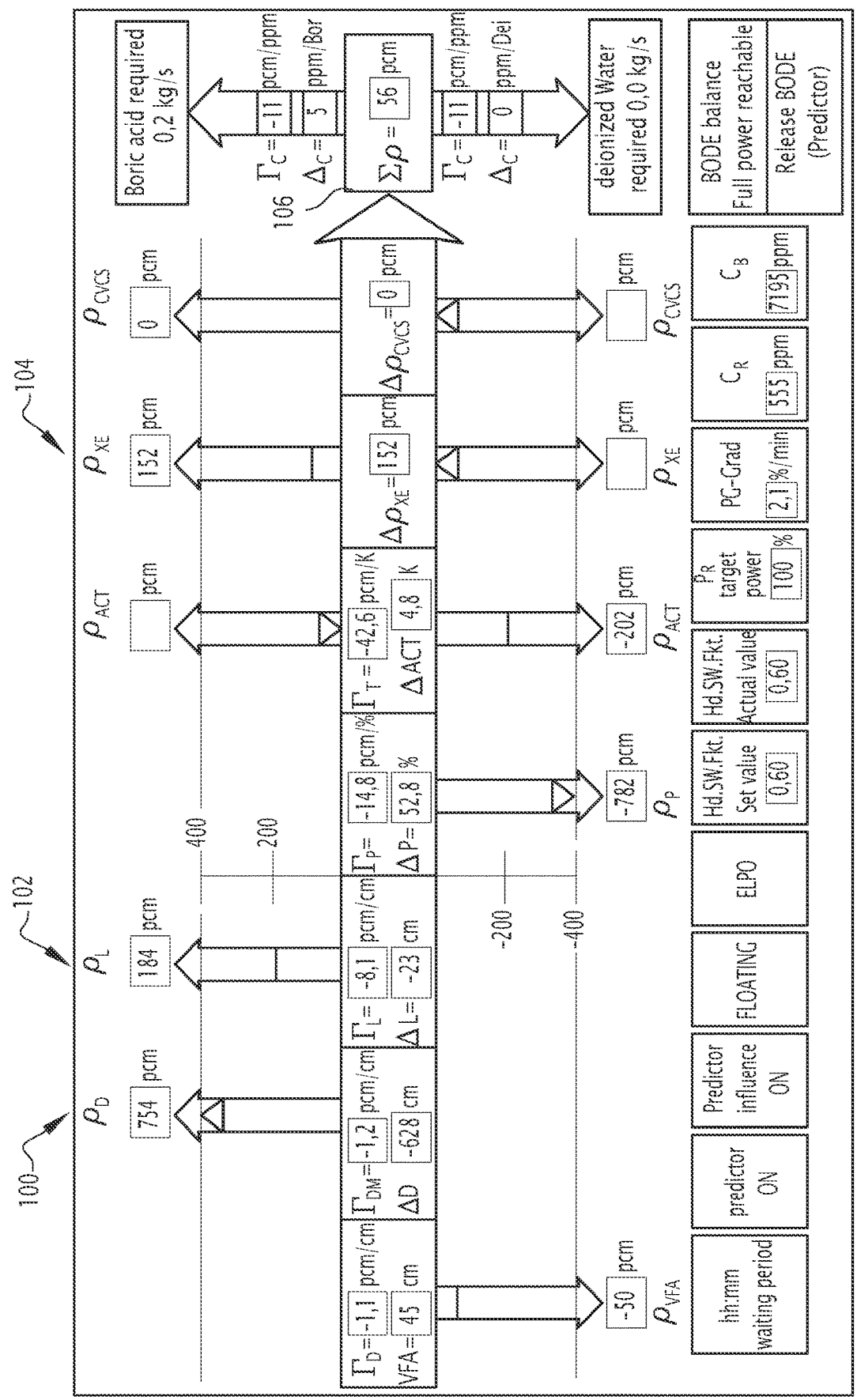
FIG. 10 shows the visualization of the reactivity management for the purpose of increasing the power of the nuclear reactor on a process computer system for the reactor operator.

The control rods or D-rods shall be raised until their stationary full power (of the nuclear reactor) setpoint (here approximately 45 cm below L-rods as control margin), which is indicated in FIG. 10 as VFA value. This will lower the possible reactivity increase by the reactivity value $\rho_{VFA}$. The stationary full power setpoint is optionally used to provide even under full power a possibility for raising the control rods in order to regulate small power variations. The reactivity $\rho_{VFA}$ of the maneuvering margin of the control rods at full load is considered separately with the reactivity coefficient at that insertion depth $\Gamma_D$. The reactivity potential $\rho_{VFA}$ is calculated by multiplying the effectivity $\Gamma_D$ with the full load setpoint distance to the set of L-rods, in particular the lower end of the L-rods. Here, the effectivity $\Gamma_D$, which is a reactivity coefficient, is provided by the reactivity coefficient module 40.

A further potential reactivity value may be the reactivity $\rho_L$ of the L-rods due to the actual insertion depth of the L-rods ($\Delta L$) below their stationary full power setpoint. The corresponding reactivity coefficient ($\Gamma_L$), which corresponds to the effectivity of the L-rods, is provided by the reactivity coefficient module 40. The movement of the L-rods is principally needed to counter the peak top tendency of the axial power distribution at part load. The reactivity potential $\rho_L$ is calculated by multiplying the effectivity $\Gamma_L$ with the actual insertion depth $\Delta L$.

Another value is the reactivity $\rho_P$ due to the future ramp up of the reactor power to $P_R$ target power ($\Delta P$) with its reactivity coefficient ($\Gamma_P$), which is provided by the reactivity coefficient module 40.

The reactivity $\rho_{ACT}$ due to difference of the Average Coolant Temperature (ACT) of the primary circuit 5 to the reference temperature at full load ($\Delta ACT$; in the present example approximately 310° C. at full load) with its reactivity coefficient $\Gamma_T$, which is provided by the reactivity coefficient module 40.

According to an embodiment, the reactivity balance may also take into account the reactivity impact $\rho_{CVCS}$ caused by deadtime effects of BODE-injections via the Chemical Volume Control System CVCS being determined by a dead time simulation combined with the relevant reactivity coefficient of the boron concentration $\Gamma_C$. In this example, also the reactivity coefficient of the boron concentration $\Gamma_C$ is provided by the reactivity coefficient module 40.

To be capable to ramp up to the $P_R$ target power, using in particular the control rods or D-rods 16, the reactivity sum $\Sigma\rho = \rho_{VFA} + \rho_D + \rho_L + \rho_P + \rho_{ACT} + \rho_{Xe} + \rho_{CVCS}$ of all considered reactivity values should be zero. There may be even more or less reactivity values for calculating the reactivity sum, the reactivity balance, the optimal control rod position and/or the predetermined control rod setpoint for the start of power ramp up. At the $P_R$ target power, i.e after ramp up, it also should be zero. Thus, the optimal position of the control rods 16 for the ramp up is determined and used for the calculation of the reactivity balance. Thus, according to embodiments, the optimal control rod positon or the predetermined control rod setpoint for the start of power ramp up is calculated based on the total (predicted) reactivity.

If there is any deviation, for example as shown in FIG. 10 with $\Sigma\rho$=56 pcm, when the control rods are not in the optimal position for the ramp up and being, in particular provided to the control rod set setpoint adjustment 54, the amount of needed BODE injection is calculated based on the reactivity coefficient of the boron concentration $\Gamma_C$ and linearized (simplified) mixture equations (see below) in relation to the sum of mass of primary circuit together with CVCS to determine the amount of BODE in kg and or kg/s (as the operator prefers). As input data for the boric acid relevant mixture equation the boron concentration in the boric acid storage tanks $c_B$ is needed. The mixture equations are as follows:

$$Q_B = M \cdot \ln\left(1 + \frac{\Delta c}{c_B - c}\right) \approx M \cdot \frac{\Delta c}{c_B - c} \quad (1)$$

$$\Delta c = (c_B - c) \cdot \left(e^{\frac{Q_B}{M}} - 1\right) \approx \frac{Q_B}{M} \cdot (c_B - c) \quad (2)$$

$$Q_D = M \cdot \ln\left(\frac{c - c_D}{(c - c_D) - \Delta c}\right) \approx M \cdot \frac{\Delta c}{c} \quad (3)$$

$$-\Delta c = (c - c_D) \cdot \left(1 - e^{-\frac{Q_D}{M}}\right) \approx \frac{c \cdot Q_D}{M}, \quad (4)$$

wherein $Q_B$ is the amount injected boric acid mass, $Q_D$ is the amount deionized water mass, c the concentration of the boric acid in the primary cooling fluid, $\Delta c$ the change of the boric acid concentration in the primary cooling fluid, $c_B$ is the boric acid concentration in the injected boric acid, $c_D$ is the boric acid concentration in the injected deionized water, and M is the mass of the primary cooling fluid together with the Chemical Volume Control System CVCS. For example the boric acid concentration in the injected boric acid is about 7000 ppm and the boric acid concentration in the injected deionized water is below 1000 ppm (parts per million).

For example, the mass M is about 300 t at 310° C.

Generally, the reactivity coefficients of the reactivity coefficient module 40 have no time delay effects or are strongly time dependent. The reactivity coefficients in the reactivity coefficient module 40 do not include coefficients for the Xenon reactivity coefficient.

According to embodiments, when the nuclear reactor is operated in the tertiary control mode, derived from the above considerations and coefficients a time criteria is calculated, in particular by the reactivity balance module 52, which determines the time before ramp up which is needed to bring the control rods 16 to the predetermined control rod setpoint for the start of power ramp up, which is needed to ramp up to the target power value, for example by using boric acid or deionized water injections. For example, for that purpose not only the predetermined control rod setpoint for the start of power ramp up, but also the actual control rod position and the mixture of the primary cooling fluid based on one or more of the above equations (1) to (4) is taken into account for the calculation of the time to reach the predetermined control rod setpoint for the start of power ramp up. If the time criteria is reached, the reactivity balance module 52 is adapted to inform the Floating/ELPO module 56 that the floating or ELPO modes should be terminated, which are called second and third submode here-below. The time criteria depends in particular on the reactivity coefficients provided by the reactivity coefficient module 40 and/or the actual setting of the control rods 16. In some embodiments, some additional time is added in order to have a security margin.

Considering the selected grid operating modes the following strategies and adaptions are automatically used:

If the secondary control mode is selected, for example if the button 36 is activated, which means that the waiting time should be zero, (N-SR is ON; waiting time is zero), the nuclear reactor has to reach a $P_R$ target power at any moment, which cannot be predicted. For that purpose, the control rods 16 must be adjusted in such a way that the $P_R$ target power can be reached through control rod 16 movement at any moment. This is done predicting the Xenon reactivity during the ramp up of power, in particular at the beginning and the end during the ramp up of power, in order to know the portion of the Xenon reactivity supports the ramp up of the power with the maximal selected power gradient dPG/dt.

Figure 6:
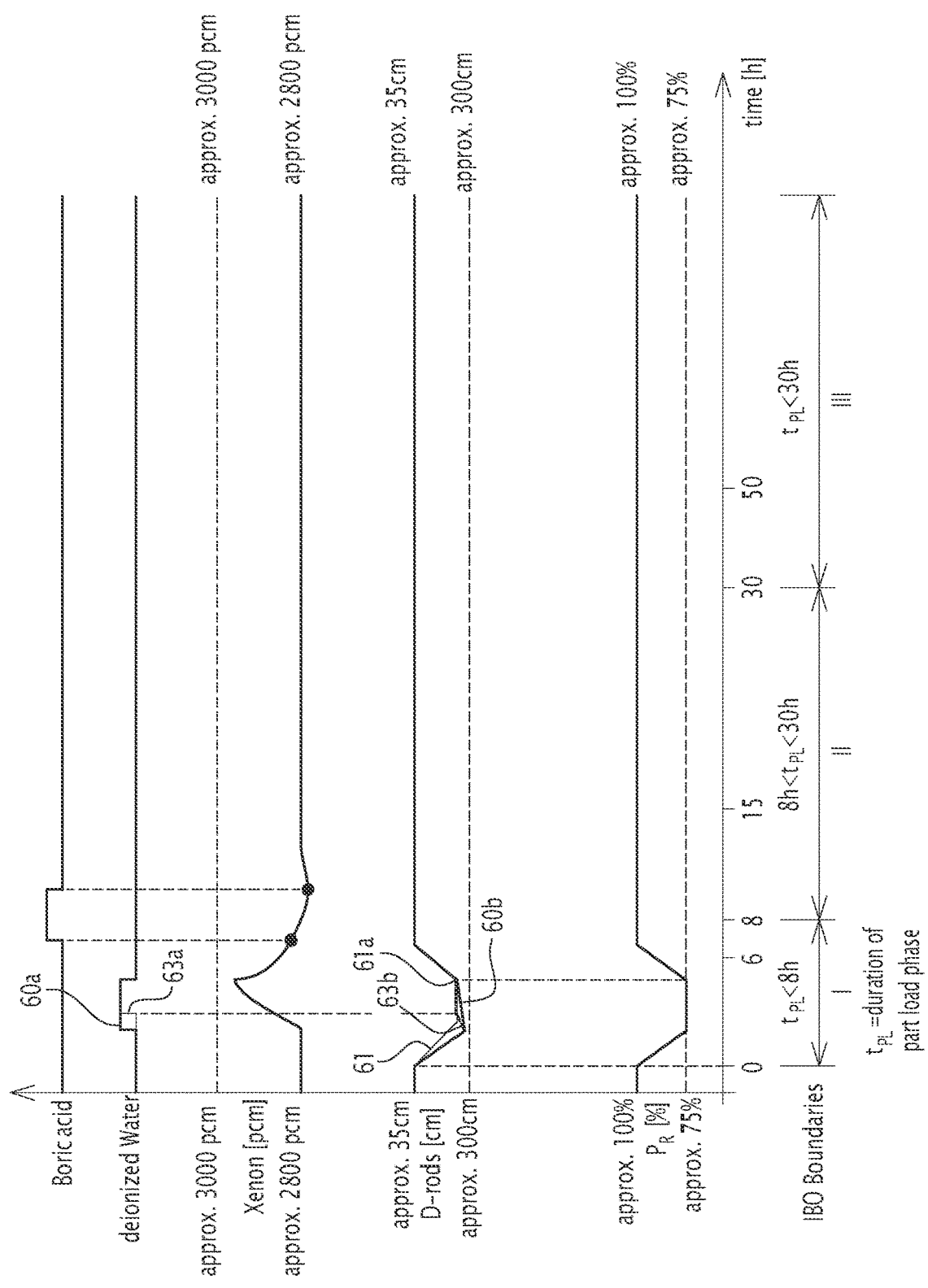
FIG. 6 shows a graph with the Xenon concentration and the control rod or D-rod position, the boric acid supply, the deionized water supply and the power of the reactor over the time for a first waiting period, which is less than 8 hours corresponding to the Xenon maximum and the D-rod position(s) remains substantially at a value which is needed for the following ramp up compared to operation in the secondary mode.

In the secondary control mode, the reaching of the target power is preponderance compared to the minimizing of the addition of boric acid and/or deionized water. E.g. the Xenon build up to Xenon-Maximum at part load has to be compensated by deionized water injection, after boric acid injection is needed as shown in FIG. 6. The boric acid injection and deionized water injection is performed, in particular automatically by the standard reactor control 58, which keeps the control rods 16 at the adjusted setpoints or positions provided by the control rods set setpoint adjustment module 54, which is provided by the reactivity balance module 52. In other words, the optimal control rod position or predetermined control rod setpoint for the start of power ramp up is directly used as setpoint by the control rods setpoint adjustment module 54. In the secondary control mode, it is not necessary to calculate a prediction of the Xenon reactivity for the waiting period. In FIG. 6, graphs for the secondary mode and a first submode of the tertiary mode are shown. With respect to the deionized water injection and the control rod 16 position, the secondary mode is shown with the continuous thick lines 60a, 60b. The other curves or graphs are equal in this special case for the secondary mode and the first submode of the tertiary mode discussed below. The graph 60b shows the setpoint of the control rods 16 and their actual value. In FIG. 6, due to the scaling the setpoint and the actual value of the position of the control rods or D-rods 16 cannot be distinguished.

Typically, the control rods 16 (D-bank or set of D-rods), after being lowered in order to reduce the power of the nuclear reactor 3, are continuously raised a bit during the waiting period till the Xenon maximum according to the calculated setpoint via the reactivity balance module 52, because the Xenon reactivity support for the ramp increases by the increased burn up effect of the Xenon.

According to embodiments, the tertiary control mode is detected by the entering of a waiting period in which the nuclear reactor is operated at partial load, so that for example a further minimization of BODE-injections can be possible.

Depending on the waiting period, the nuclear reactor can be controlled in one or more, in particular three different submodes. The beginning of the waiting period is defined as the time at which the power is reduced to a partial power. For example, the partial power may be between 30% and 90% of the maximal power of the nuclear reactor. In the following, these three different modes are detailed.

When the power is reduced, the Floating/ELPO module 56 stores automatically dependent on the adjusted waiting time, which submode is used.

According to embodiments, the control of the setpoints during floating mode or ELPO have preponderance over the control of the setpoint given by the reactivity balance 52. For example, if the Floating/ELPO module 56 provides information to the control rods set setpoint adjustment module 54, whether a floating mode or an ELPO mode is used this overrules the setpoints provided by the reactivity balance module 52. In other words, depending on the adjusted waiting time, the Floating/ELPO module 56 provides information to the control rods set setpoint adjustment module 54, whether a floating mode or an ELPO mode is used. Then, the control rods set setpoint adjustment module ignores the setpoints provided by the reactivity balance module 52.

For example in case of a waiting period $t_{PL}$, which corresponds to a part load time or duration of the part load phase, at partial load being less than a first predetermined time, a first submode is used. The first predetermined time is related to the time to reach the maximum Xenon concentration. That means, that it can be expected, that there is only a reactivity loss by Xenon in this time period of approximately 8 hours. In some embodiments, the first predetermined time is for example 2 h after the Xenon maximum or 30% of the waiting time until the Xenon maximum after the Xenon maximum. According to an embodiment, which is shown in FIG. 6, the control rods setpoints 61 (thin line) are determined such that the $P_R$ target power can be reached after the waiting time. Here the setpoint 61a corresponds to the predicted position of the control rods that enable to reach the target power after power ramp up. The reactivity reduction due to the Xenon concentration is compensated by the addition of deionized water via the reactor control 58 as in the secondary control mode. The first line and second line show the phases where boric acid and deionized water is added to the primary circuit. Compared to the secondary mode, the injection of deionized water starts a bit later as in the above mentioned example of the secondary control mode, see thin line 63a, because the control rods 16 (set of D-rods) have to be withdrawn—compensating the Xenon-build up—to reach their setpoint for power ramp up, see dashed line 63b which reaches the control rods setpoint 61a. The boric acid injection is blocked by signalization of Xenon-build up in the standard reactor control 58. Considering the waiting period this setpoint for the control rods 16 hereby considers the Xenon reactivity support for ramp up in the Xenon maximum due to the increased burn up effect from the beginning of the waiting period. The remaining curves of the first submode of the tertiary control mode corresponds to the curves of the secondary control mode in FIG. 2, i.e. during reducing of the power, the actual control rod position corresponds to the thick line.

The amount of boric acid and deionized water is determined by the standard reactor control 58, which keeps control rods 16 at the adjusted setpoints provided by the control rod set setpoint adjustment module 54, which is provided by the reactivity balance module 52. As stated above, the Floating/ELPO module 56 does not provide setpoints to the control rod set setpoint adjustment module 54. The predetermined control rod setpoint for the start of power ramp up provided by the reactivity balance module 52 is used.

The third line shows the Xenon concentration over the time, the fourth line the position of the control rods 16 (their insertion into the reactor core in centimeters) and the fifth line the power of the nuclear reactor 3 over the time. This control submode functions similar to the secondary control mode. Only the waiting time is considered in the Xe-Prediction in this case. Hereby the visualization of the reactivity balance, for example as shown in FIG. 10, in the ramp up phase for the reactor operator is more precise even at the beginning of the waiting time.

According to this example, a control rod setpoint 61a for/at the end of the waiting period is shown, which is based on the entire reactivity balance including the predicted Xenon reactivity to support ramping up the nuclear reactor 3 in the Xenon maximum. In other words, it is the predicted control rod setpoint for the start of power ramp up. When entering the partial power mode, the control rods or D-rods 16 are lowered in order to reduce the power of the nuclear reactor 3, here to about 75% of the full power. As it can be seen from FIG. 6, the Xenon concentration raises during the waiting period. This is compensated by adding deionized water to the primary circuit 3 after reaching the predicted setpoint 61a by the control rods 16. Latest until the end of waiting period (here, the waiting period is about 6 h), the control rods 16 reach the control rod setpoint 61a at a position for the start of power ramp up. During the ramp up, the Xenon concentration is reduced due to the effects already described above (i.e. the Xenon-135 burns off). After reaching the $P_R$ target power, the Xenon concentration still reduces, so that boric acid is added to the primary circuit in order to decrease the reactivity, which is due to the decreased Xenon concentration.

Figure 7:
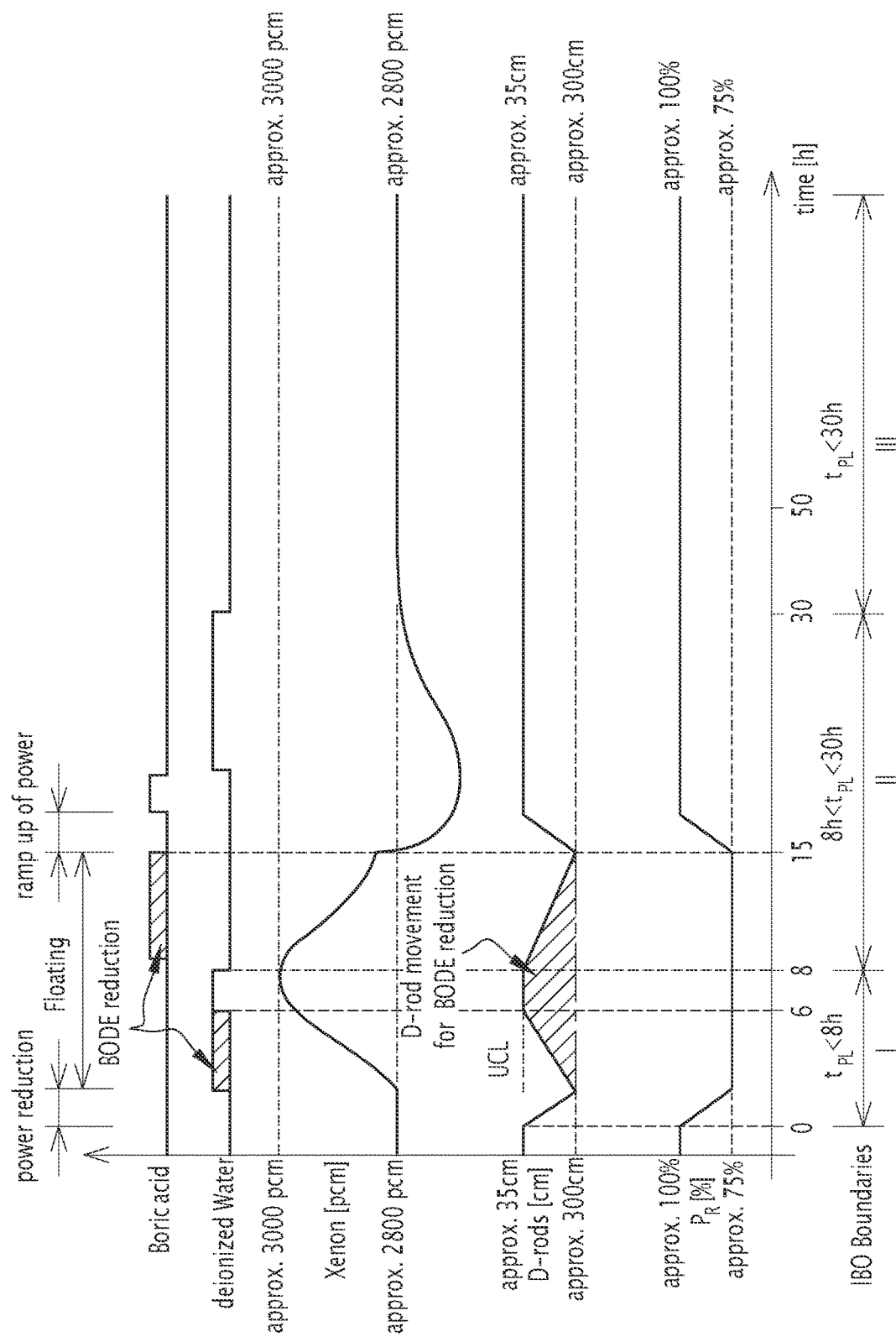
FIG. 7 shows a graph with the Xenon concentration and the control rod or D-rod position, the boric acid supply, the deionized water supply and the power of the reactor over the time for a second waiting period, which is between 8 hours and approx. 30 hours with minimized boric acid and deionized water injection by using the control rods for Xenon compensation.

In FIG. 7, the waiting period $t_{PL}$ at partial load is between the first predetermined time, for example 8 hours, and a second predetermined time, for example about 30 hours. That means that it can be expected that there is after the reactivity loss by Xenon a reactivity win and this can be compensated by moving the control rods 16 to minimize BODE-injections extremely. For this purpose, a second submode is used, the so called floating mode. The second predetermined period (here about 30 hours) correspond to a time where different aspects, in particular regarding ELPO, have to be considered during long term part load operation, in particular that the D-sets or control rods shall be in their "full load position" to have an optimized fuel burn up and an optimal conditioned core regarding pellet cladding interaction (PCI).

In the second submode, the Floating/ELPO module 56 informs the control rod set setpoint adjustment module 54 that the second submode or floating mode should be used. According to embodiments, the module 54, upon reception of the information that the second submode or floating mode should be used, commands the standard reactor control 58 to inhibit BODE injections to compensate the Xenon concentration change, in particular within the upper control limit (UCL) and lower control limit of the control rods 16. Thus, in case of constant power of the nuclear reactor 3, the Xenon concentration is compensated by the movement of the control rods 16 by the standard reactor control 58, for example indirectly via the ACT control. In other words, the module 54 ignores the setpoints provided by the reactivity balance module 52.

The second submode or floating mode will be explained in detail with the help of FIG. 7. The first line and second line show the phases where boric acid and deionized water is added to the primary circuit. The amount of boric acid and deionized water is extremely minimized compared with the cases before, because the normal control rod D-set control is deactivated regarding activation of BODE-injections and the D-set or control rods moves to compensate the Xenon reactivity change (e.g. via the ACT controller within the reactor control 58). According to embodiments, the control rods 16 are moved between regulating limit values within the standard reactor control (for example UCL="upper control limit" to ensure a minimal distance to the lower end of the set of L-rods). Thus it is ensured that the control rods 16 will not be inserted too little. The third line shows the Xenon concentration over the time, the fourth line the position of the control rods 16 (their insertion into the reactor core or nuclear core in centimeters) and the fifth line the power of the nuclear reactor 3 over the time.

In this second submode, the increase of the Xenon concentration is compensated by the control rods 16. In other words, the control rods 16 are moved out of the reactor core until they reach their upper control limit UCL. If still further compensation of the increase of the Xenon concentration is needed, some deionized water is added to the primary circuit, see the maximum of the Xenon concentration graph, between approximately 6 h and 8 h. When the Xenon concentration decreases after its maximum, the total reactivity increases so that the control rods are moved down in the reactor core until a depth of approximately 300 cm, which they reach at approximately 15 h. In this special case the rods reach at approximately 15 h the predetermined position for ramping up the power to the $P_R$ target power.

When the power should be increased to the $P_R$ target power, here 100% of the power of the nuclear reactor 3, the control rods 16 are raised up. At the same time, the Xenon concentration decreases, so that after reaching the target power, the further reduction of the Xenon concentration is compensated by the addition of boric acid. After the minimum Xenon concentration, the Xenon concentration raises to an equilibrium state after about 30 h. The creation of Xenon corresponds in the equilibrium state to the burn off of Xenon due to neutron absorption and Xenon decay. During the raise, again deionized water is added to compensate the change of concentration of the Xenon.

As it can be seen from FIG. 7, which shows with the hatched regions the comparison with a reactor control, where the control rods remain inserted for the later ramp up. The example in FIG. 7 shows the maximal boric acid and deionized water reduction compared to a standard regulation without considering the waiting time. It should be noted that the reduction of boric acid and deionized water increases when the end of the cycle approaches, i.e. before the fuel rods have to be exchanged to new ones, as the deionized water additions increase extremely. For example, to have the same effect, the deionized water addition is at the end of the cycle exponentially higher (in the last 20% of the fuel element cycle more than 10 times higher) compared to the beginning of the cycle. Thus, the costs for treating or recycling of the cooling water of the primary circuit 5 increases or otherwise the load flexibility will be decreased.

If the waiting time would be shorter than in this example in FIG. 7 (e.g. 11 hours) the control rods would not reach the predetermined control rod setpoint for the power ramp up or the control rod setpoint for the start of power ramp up by simply compensating the decrease of the Xenon concentration, the Floating/ELPO module 56 receives a signal from the reactivity balance module 52, for example a termination signal "time criteria reached", to terminate the floating mode. Hereby the control is handed over to the standard reactor control 58, which is adapted to control the valve 28 in order to add further deionized water to the primary circuit 5 so that the control rods 16 can reach the predetermined control rod setpoint for the start of power ramp up, provided by reactivity balance module 52, till the end of the waiting period for ramping up the power. In other words, the predetermined control rod setpoint for the start of power ramp up is provided by the control rod set value adjustment 54 according to the result of the reactivity balance 52 and with calculated waiting time in the Xenon prediction module 46.

If the waiting time would be longer than in this example in FIG. 7 (e.g. 20 hours) the control rods would exceed the predetermined control rod setpoint for the start of power ramp up, the predetermined control rod setpoint being determined by the reactivity balance module 52, by simply compensating the further decrease of the Xenon concentration, the Floating/ELPO module 56, for example by receiving a signal from the reactivity balance module 52, terminates the second "floating" submode and the control is handed over to the standard reactor control 58. This is important in order to be able to further insert the control rods 16 into the reactor core in case of an emergency shut down (ensure shut down reactivity). In other words, the control rods 16 are not lowered further because the standard reactor control starts the boric acid injection according to the control deviation, which is given by the actual control rod position compared to their predicted setpoint provided by the control rods set setpoint adjustment 54.

Figure 8:
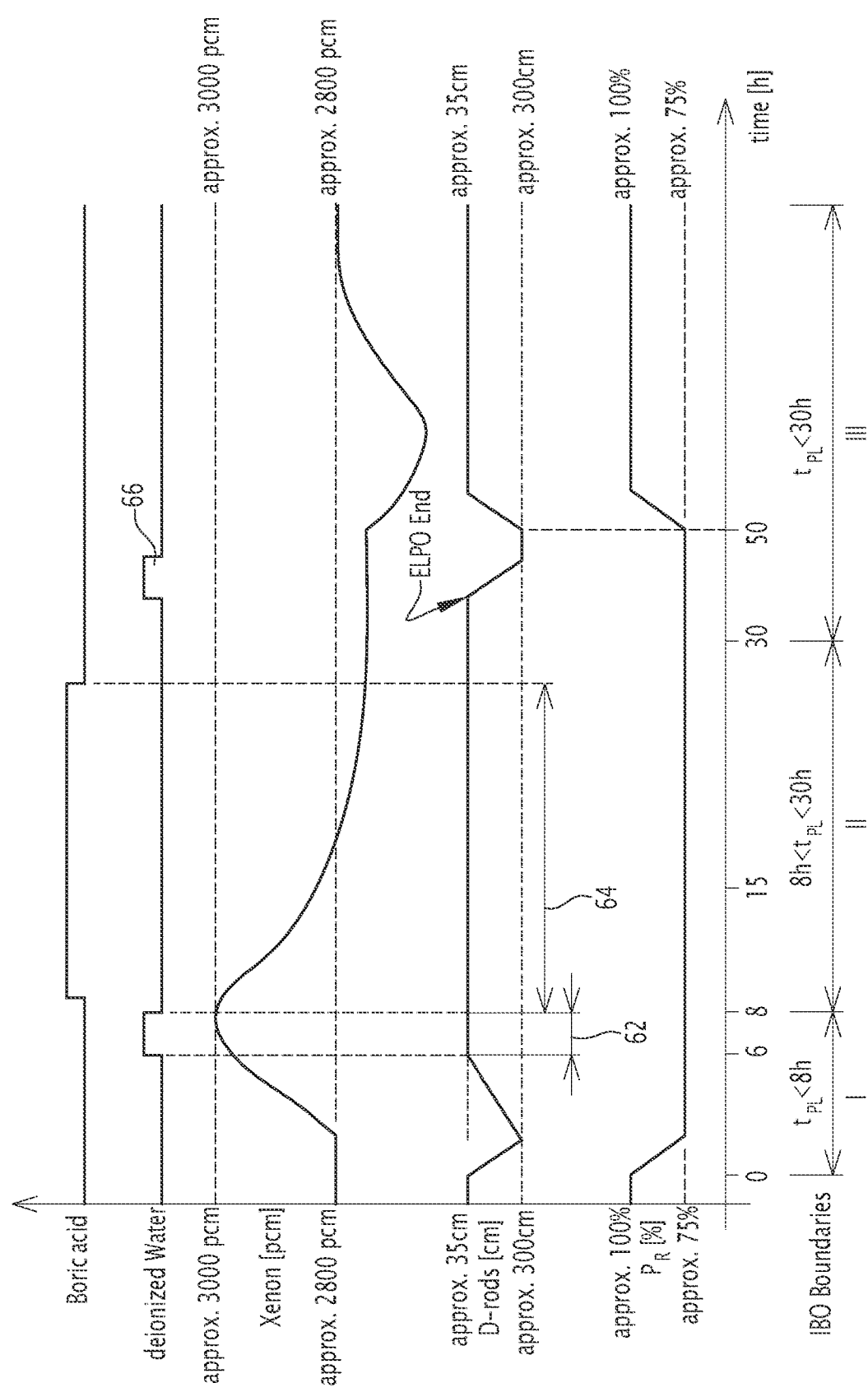
FIG. 8 shows a graph with the Xenon concentration and the D-rod position, the boric acid supply, the deionized water supply and the power of the reactor over the time for a third waiting period, which is longer than approximately 30 hours with a control rod position for a full power operation for Extended Low Power Operation (ELPO) using Xenon for extracting the D-rods and deionized water via the automatic reactivity balance to bring them back to the needed position for ramp up at the end of the adjusted waiting time.

In FIG. 8, when the waiting period $t_{PL}$ at partial load is greater than the second predetermined time, for example approx. 30 hours, a third submode is used. The third submode may be also called Extended Low Power Operation (ELPO) mode.

This second predetermined period (here approximately 30 h but it can be much longer e.g. 60 h) corresponds to a time where different aspects regarding ELPO have to be considered: during long term part load operation the D-sets shall be in their "full load position" to have an optimized fuel burn up and an optimal conditioned core regarding pellet cladding interaction (PCI). For example, the second predetermined period is at least 30 h.

The third submode will be explained with the help of FIG. 8. The first line and second line show the phases where boric acid and deionized water is added to the primary circuit. The amount of boric acid and deionized water is in this case also minimized because the Xenon build up (after reaching part load) is used to withdraw the D-set to "full load position". In other words, the reactor core is nearly control rod free. The third line shows the Xenon concentration over the time, the fourth line the position of the control rods 16 (their insertion into the reactor core in centimeters) and the fifth line the power of the nuclear reactor 3 over the time.

In the third tertiary submode the Floating/ELPO module 56 has precedence with respect to the control rod set value adjustment module 54 compared to the predicted setpoint of the reactivity balance module 52. In the third submode, the Floating/ELPO module 56 informs the control rod set setpoint adjustment module 54 that the third submode or ELPO mode should be used. According to embodiments, the module 54, upon reception of the information that the third submode or ELPO should be used, commands that the set values for the control rods 16 should be the "full load position" (nearly control rod free or full power position). Thus, in case of constant power of the nuclear reactor 3, after the control rods have reached the full load position, the Xenon concentration is compensated by BODE injections by the standard reactor control 58, for example indirectly via the ACT control. In other words, the module 54 ignores the setpoints provided by the reactivity balance module 52.

In a first step, the control rods are lowered or inserted into the reactor core in order to reduce the power of the nuclear reactor 3. In the example of FIG. 8, the power is reduced to 75% of full power. Then, the Xenon concentration increases and the control rods 16 are withdrawn out of the reactor core in order to compensate the reactivity loss due to the increase of the Xenon concentration. The control rods 16 are moved out of the reactor core until they reach their "full load position" (nearly control rod free) or, in parallel, the upper control limit UCL. If still further compensation of the increase of the Xenon concentration is needed some deionized water is added to the primary circuit, see the maximum of the Xenon concentration graph, between 6 h and 8 h, see reference sign 62. When the Xenon concentration decreases after its maximum, the total reactivity increases and boric acid is added into the primary circuit 5 by the standard reactor control 58, which is given by the setpoint "full load position" of the control rods set setpoint adjustment module 54 and the actual control rod 16 position. According to embodiments, the boric acid is added in a discontinuous manner. The boric acid is added, until an equilibrium of the Xenon concentration is reached, i.e. that the Xenon gradient is nearly zero, in FIG. 8 during the period with the reference sign 64.

Before the end of the waiting period, the control rods 16 have to be moved to the predetermined control rod setpoint for power ramp up. Thus, in due time before the end of the waiting period, the third submode or ELPO mode is terminated in the Floating/ELPO submodule 56, by receiving the termination signal "time criteria reached" from the reactivity balance module 52. Then, the reactivity balance module 52 provides the set points for the control rods 16 to the control rods set setpoint adjustment module 54, which corresponds to the predetermined control rod position or setpoint before ramp up, and the standard reactor control 58 injects deionized water, which moves the control rods 16 to the predetermined control rod setpoint for the start of power ramp up provided by the control rod set value adjustment 54. Deionized water is added, see reference sign 66, to the primary circuit 5 during the movement of the control rods 16 to the predetermined control rod set value.

In this third submode, the control rods are moved out of the reactor core in order to have the fuel rods burn off homogenously and due to pellet clad interaction (PCI).

The third submode or ELPO submode is terminated between 1 h and 3 h before the waiting time ends, according to the generation of the signal "time criteria reached" provided by the reactivity balance module 52 based on the reactivity and mixture balance of the primary cooling fluid. It should be noted that the control rods 16 do not exceed a lower regulation limit LRL, in particular in each of the tertiary control submodes. The lower regulation limit LRL depends on the actual power $P_R$ of the nuclear reactor. The higher the actual power, the higher lower regulation limit in order to enable the nuclear reactor to be shut down at any moment using the control rods 16.

According to embodiments, as already discussed above, the reactivity balance module 52 further determines, based on the predicted Xenon reactivity and the reactivity coefficients of the reactivity coefficient module 40, whether the tertiary control modes Floating or ELPO should be terminated. For this purpose, the reactivity balance module 52 determines, based on the actual reactivity coefficients, the predetermined control rod-setpoint, the actual control rod 16 position and the mixture balance (according to the simplified mixture equations (1) to (4) mentioned above) the needed injection time to bring the D-sets to the needed position for ramp up. If this needed injection time plus a tolerance becomes greater than the remaining waiting time the signal "time criteria reached" is active and terminates ELPO or Floating mode.

The reactor control 58 may also work without the predicted Xenon reactivity values and also works without the modules 52, 56 and 38. In this case the D-rod set setpoint has to be set manually.

Figure 9:
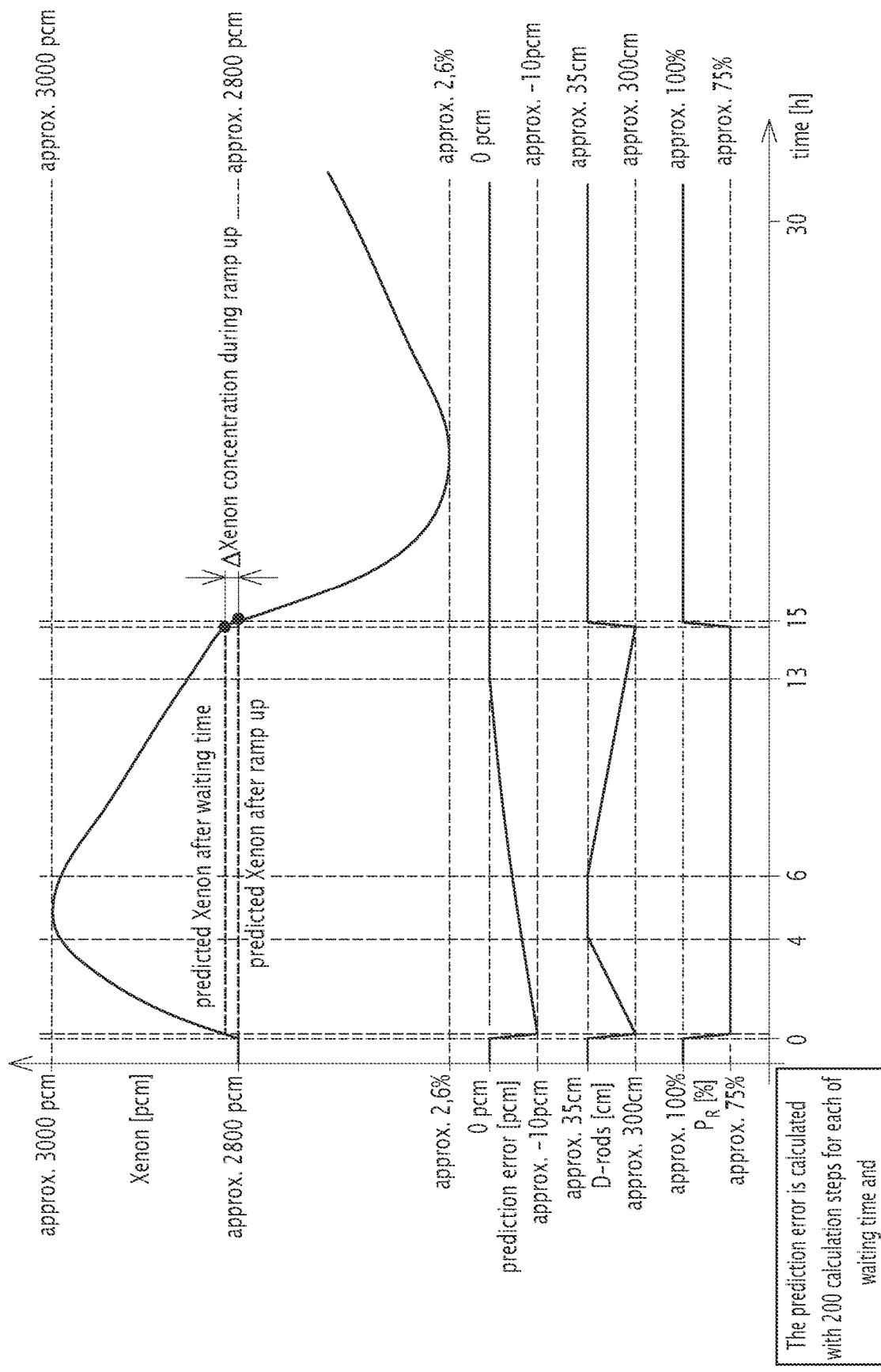
FIG. 9 shows a graph detailing the prediction error of the Xenon concentration based on an adjustment of the Xenon prediction with 200 calculation steps.

The accuracy of the Xenon prediction module with 200 calculation steps, for each the waiting time and the ramp up time, is shown in FIG. 9 with an example of a part load time of 15 hours. As it can be seen from FIG. 9, which shows from the top to the bottom the Xenon concentration, the prediction error, the position of the control rods or D-rods 16 and the power of the reactor in an example of the tertiary control mode using the second submode (Floating mode), the prediction error decreases as the end of the waiting period approaches. This is due to the cyclically repeated calculation of the prediction of the Xenon reactivity, which works with the remaining waiting period. The error is compared to the regulating preciseness substantially low. Even at the beginning of the waiting time this calculation error is little with a value of 10 pcm. This is comparable with a control rod set deviation of approx. 8 cm, if the reactivity coefficient of the control rod set is 1.2 pcm/cm. Compared with the control threshold for the control rod set at part load of 30 cm is insignificant.

FIG. 10 shows a visualization for an operator of a nuclear reactor. The visualization may be provided on a screen. The visualization shows additional to in the beginning discussed reactivity balance arrow the remaining waiting period and if the grid relevant submodes ELPO or Floating mode are set. Further, FIG. 10 shows the $P_R$ target power, the ramp up rate of 2.1%/min (PG-Grad=dPG/dt), which is derived from the turbine control. "Hd. SW-Fkt." refers to the manual setpoint for the control rod 16 as a proposal for the reactor operator, if the predictor influence to the reactor control should be switched of, whereas "Hd. SW Fkt. actual value" is the really effective value in the reactor control of the control rods 16.

According to some embodiments, the time constants and control intensity bands may be adapted for the control of the nuclear reactor in case of the selected primary control mode.

According to embodiments, the method or algorithms for the Xenon prediction enables minimized calculation steps and is adapted to the selected grid control mode for determining the Xenon contribution in the expected ramp up phase which is needed for the implementation into a real time digital reactor control. The in the embodiments used method allows all grid relevant control modes (even unexpected transients as load rejection to inhouse load) including stochastic remote controlled load changes by the tandem Xenon calculation with one calculation of actual Xenon and Iodine value as basis for the second predictive calculation of the Xenon contribution in the ramp up phase.

In some examples of implementation, any feature of any embodiment described herein may be used in combination with any feature of any other embodiment described herein.

What is claimed is:

1. A method for controlling a nuclear power plant comprising a pressurized water nuclear reactor having a reactor core producing power, a primary circuit connecting the reactor core to a steam generator, one or more control rods movable into the reactor core for controlling the power of the reactor core, an injecting device for injecting boric acid and/or deionized water into the primary circuit for controlling the reactivity of the reactor core, the method comprising:
- determining an actual power of the nuclear reactor;
- determining automatically an actual Xenon concentration, an actual Iodine concentration, and an actual Xenon reactivity;
- obtaining a target power and a power gradient for a power ramp up period until a target power;
- obtaining a waiting period and/or a remaining waiting period in which the nuclear reactor works at a partial power until the nuclear reactor ramps up to a target power being higher than the partial power;
- calculating for an end of the obtained waiting period and/or remaining waiting period the Xenon reactivity and/or Xenon concentration based on the actual Xenon concentration, the actual Iodine concentration and the obtained waiting period and/or remaining waiting period;
- calculating, for an end of the power ramp up period, the Xenon reactivity and/or the Xenon concentration;
- calculating a control rod setpoint for a start of power ramp up for the one or more control rods based on the calculated Xenon reactivity and/or Xenon concentration at the end of the obtained waiting period and/or remaining waiting period and the end of the ramp up period, so that the power ramp up is performable using the control rods;
- positioning, during the obtained waiting period and/or remaining waiting period, the one or more control rods based on the obtained waiting period and/or remaining waiting period and the control rod setpoint for the start of the power ramp up, so that the one or more control rods reach the control rod setpoint for the start of power ramp up at the end of the obtained waiting period and/or remaining waiting period,
- determining that the obtained waiting period and/or remaining waiting period is greater than a first predetermined time, the first predetermined time allowing raising of the Xenon concentration to a maximal value, and responsive to the determination:
  - moving the one or more control rods out of the reactor core for compensating the reactivity loss due to an increase of the Xenon concentration, and
  - moving the one or more control rods into the reactor core to the control rod setpoint for the start of power ramp up before the end of the obtained waiting period and/or remaining waiting period.

2. The method according to claim 1, wherein the calculation of the control rod setpoint for the start of power ramp up is further based on one or more reactivity values and/or reactivity coefficients of the nuclear reactor.

3. The method according to claim 2, wherein the reactivity coefficients of the nuclear reactor include one or more reactivity coefficients of the one or more control rods, a reactivity coefficient of one or more L-rods, a reactivity change due to the difference of the Average Coolant Temperature between the actual power and the target power, a reactivity change due to the difference between the actual power and the target power, and/or reactivity contribution of a follow up flow of injected boric acid or deionized water in combination with the coefficient of the boric acid in the primary cooling fluid.

4. The method according to claim 1, wherein the calculation of the control rod setpoint for the start of power ramp up is further based on a full power setpoint of the control rods and/or a full power setpoint of L-rods.

5. The method according to claim 1, further comprising determining that the control rods reach at an upper control limit or a full load position when moving out of the reactor core, responsive to the determination adding some deionized water to maintain the reactor at partial power to compensate the reactivity loss due to the increase of the Xenon concentration to ensure the controllability of the reactor power.

6. The method according to claim 1, further comprising:
- determining a time limit for one or more control rods to move to the control rod setpoint for the start of power ramp up based on an actual control rod position, the control rod setpoint for the start of the power ramp up and an actual boric acid concentration in the primary cooling fluid;
- in order to move the one or more control rods into the reactor core to the control rod setpoint for the start of power ramp up before the determined time limit by injection of deionized water into the primary circuit; and
- adding deionized water to the primary circuit.

7. The method according to claim 6, wherein the time limit is further determined based on a minimum feed in rate of the deionized water.

8. The method according to claim 1, further comprising determining that the obtained waiting period and/or remaining waiting period is shorter than a second predetermined time, the second predetermined time being longer than the first predetermined time,
- responsive to the determining that the obtained waiting period and/or remaining waiting period is shorter than the second predetermined time, the one or more control rods are moved, after the Xenon concentration has reached its maximum during the obtained waiting period and/or remaining waiting period, into the reactor core for compensating the reactivity increase due to the decrease of the Xenon concentration.

9. The method according to claim 1, further comprising determining that the obtained waiting period and/or remaining waiting period is shorter than a second predetermined time, the second predetermined time being longer than the first predetermined time,
- responsive to the determining that the obtained waiting period and/or remaining waiting period is shorter than the second predetermined time, the method further comprises determining that, during the movement into the reactor core, the control rods reach the control rod setpoint for the start of power ramp up,
- responsive to the determining that the control rods reach the control rod setpoint for the start of power ramp up adding boric acid to the primary circuit and maintaining the control rods at the control rod setpoint for the start of power ramp up to ensure a shutdown reactivity.

10. The method according to claim 1, further comprising determining that the obtained waiting period and/or remaining waiting period is longer than a second predetermined time, the second predetermined time being longer than the first predetermined time,
- responsive to the determining that the obtained waiting period and/or remaining waiting period is longer than a second predetermined time, the method further comprises after the Xenon concentration has reached a maximum during the obtained waiting period and/or remaining waiting period, adding boric acid into the primary circuit for compensating the reactivity increase due to the decrease of the Xenon concentration, wherein the control rods remain at an upper control limit or a full power position until the movement of the one or more control rods into the reactor core to the control rod setpoint for the start of power ramp up before the end of the obtained waiting period and/or remaining waiting period.

11. The method according to claim 10, wherein the second predetermined time is between 20 h and 60 h.

12. The method according to claim 1, wherein the first predetermined time corresponds to a time 2 h after the maximum of the Xenon concentration or 30% of the waiting time until a next maximum of the Xenon concentration after the maximum of the Xenon concentration.

13. The method according to claim 1, wherein the first predetermined time is between 6 h and 10 h.

14. The method according to claim 1, wherein the method further comprises calculating a total reactivity, including the Xenon reactivity, for the end of the obtained waiting period and/or remaining waiting period and the end of the ramp up period for ramping up the power to the target power for calculating the control rod setpoint for the start of power ramp up.

15. A controller for a nuclear power plant comprising a pressurized water nuclear reactor having a reactor core producing power, a primary circuit connecting the reactor core to an steam generator, one or more of control rods movable into the reactor core for controlling the power of the reactor core, an injecting device for injecting boric acid and/or deionized water into the primary circuit for controlling the reactivity of the reactor core, the controller being adapted to:
- determine an actual power of the nuclear reactor;
- determine automatically an actual Xenon concentration, an actual Iodine concentration, and an actual Xenon reactivity;
    - obtain a target power and a power gradient for a power ramp up period until a target power;
    - obtain a waiting period and/or a remaining waiting period in which the nuclear reactor works at a partial power until it ramps up to a target power being higher than the partial power;
- calculate for an end of the obtained waiting period and/or remaining waiting period the Xenon reactivity and/or Xenon concentration based on the actual Xenon concentration, the actual Iodine concentration and the obtained waiting period and/or remaining waiting period;
- calculate, for an end of the power ramp up period, the Xenon reactivity and/or the Xenon concentration;
- calculate a control rod setpoint for a start of power ramp up for the one or more control rods based on the calculated Xenon reactivity and/or Xenon concentration at the end of the obtained waiting period and/or remaining waiting period and the end of the ramp up period, so that the power ramp up can be performed using the control rods;
- position, during the obtained waiting period and/or remaining waiting period, the one or more control rods based on the obtained waiting period and/or remaining waiting period and, the control rod setpoint for the start of power ramp up, so that the one or more control rods reach the control rod setpoint for the start of power ramp up at the end of the obtained waiting period and/or remaining waiting period,
- determine that the obtained waiting period and/or remaining waiting period is greater than a first predetermined time, the first predetermined time allowing raising of the Xenon concentration to a maximal value, and responsive to the determination the controller is further adapted to:
- move the one or more control rods out of the reactor core for compensating the reactivity loss due to an increase of the Xenon concentration, and
- move the one or more control rods into the reactor core to the control rod setpoint for the start of power ramp up before the end of the obtained waiting period and/or remaining waiting period.

* * * * *